United States Patent
Fazeli et al.

(10) Patent No.: US 11,521,634 B2
(45) Date of Patent: Dec. 6, 2022

(54) SYSTEM AND METHOD FOR ACOUSTIC ECHO CANCELATION USING DEEP MULTITASK RECURRENT NEURAL NETWORKS

(71) Applicant: Samsung Electronics Co., Ltd., Suwon-si (KR)

(72) Inventors: Amin Fazeli, San Diego, CA (US); Mostafa El-Khamy, San Diego, CA (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 17/015,931

(22) Filed: Sep. 9, 2020

(65) Prior Publication Data

US 2020/0411030 A1    Dec. 31, 2020

Related U.S. Application Data

(63) Continuation of application No. 16/573,573, filed on Sep. 17, 2019, now Pat. No. 10,803,881.

(Continued)

(51) Int. Cl.
*G10L 21/0232* (2013.01)
*H04R 3/04* (2006.01)
(Continued)

(52) U.S. Cl.
CPC ............ *G10L 21/0232* (2013.01); *G06N 3/08* (2013.01); *G06N 20/10* (2019.01); *H04R 3/04* (2013.01); *G10L 2021/02082* (2013.01)

(58) Field of Classification Search
CPC ....... G10L 2021/02082; G10L 21/0208; G10L 21/0232; G10L 25/30; G10L 2021/02166;
(Continued)

(56) References Cited

U.S. PATENT DOCUMENTS 5,621,724 A    4/1997 Yoshida
5,737,485 A    4/1998 Flanagan et al.
(Continued)

FOREIGN PATENT DOCUMENTS

WO    WO 2018190547 A1    10/2018

OTHER PUBLICATIONS

U.S. Notice of Allowance dated Dec. 24, 2021, issued in U.S. Appl. No. 16/751,094 (12 pages).

(Continued)

*Primary Examiner* — Lun-See Lao
(74) *Attorney, Agent, or Firm* — Lewis Roca Rothgerber Christie LLP

(57) ABSTRACT

A method for performing echo cancellation includes: receiving a far-end signal from a far-end device at a near-end device; recording a microphone signal at the near-end device including: a near-end signal; and an echo signal corresponding to the far-end signal; extracting far-end features from the far-end signal; extracting microphone features from the microphone signal; computing estimated near-end features by supplying the microphone features and the far-end features to an acoustic echo cancellation module including: an echo estimator including a first stack of a recurrent neural network configured to compute estimated echo features based on the far-end features; and a near-end estimator including a second stack of the recurrent neural network configured to compute the estimated near-end features based on an output of the first stack and the microphone signal; computing an estimated near-end signal from the estimated near-end features; and transmitting the estimated near-end signal to the far-end device.

18 Claims, 15 Drawing Sheets

Related U.S. Application Data

(60) Provisional application No. 62/838,146, filed on Apr. 24, 2019, provisional application No. 62/825,681, filed on Mar. 28, 2019.

(51) Int. Cl.
  *G06N 20/10* (2019.01)
  *G06N 3/08* (2006.01)
  *G10L 21/0208* (2013.01)

(58) Field of Classification Search
  CPC ......... G10L 15/20; G10L 15/16; G10L 15/22; G10L 19/0212; G10L 19/022; G10L 19/26; G10L 21/0224; G10L 21/02; G10L 21/0216; G10L 25/87; G10L 15/00; G10L 15/02; G10L 15/063; G10L 15/183; G10L 15/30; G10L 15/32; G10L 17/04; G10L 17/18; G10L 2015/0635; G10L 2015/088; G10L 2015/223; G10L 25/78; G10L 25/84; G10L 13/00; G10L 15/26; G10L 19/0018; G10L 2015/025; G10L 2021/02087; G10L 21/0264; H04M 9/082; H04M 9/08; H04M 3/002; H04R 3/04; H04R 27/00; H04R 3/02; H04R 3/005; H04R 1/406; H04R 2201/401; H04R 2499/11; H04R 29/001; H04B 3/23; H04L 25/03878; H04L 25/4927; H04L 5/14; H04S 7/305
  USPC .............................. 381/71.1–71.5, 94.1–94.5
  See application file for complete search history.

(56) References Cited

U.S. PATENT DOCUMENTS

| | | | |
|---|---|---|---|
| 7,742,608 B2 | 6/2010 | Truong et al. | |
| 8,204,210 B2 | 6/2012 | Van de Laar | |
| 10,074,380 B2 | 9/2018 | Wung | |
| 10,803,881 B1* | 10/2020 | Fazeli | G06N 20/10 |
| 2005/0091050 A1 | 4/2005 | Surendran et al. | |
| 2006/0034448 A1 | 2/2006 | Parry | |
| 2012/0063492 A1* | 3/2012 | Palanki | H04W 56/001 375/211 |
| 2018/0006794 A1* | 1/2018 | Lee | H04L 5/14 |
| 2018/0040333 A1* | 2/2018 | Wung | G10L 21/0232 |
| 2018/0261225 A1 | 9/2018 | Watanabe et al. | |
| 2019/0103124 A1 | 4/2019 | Zhang et al. | |
| 2019/0122685 A1* | 4/2019 | Defraene | G06N 20/00 |
| 2019/0132452 A1 | 5/2019 | Liu et al. | |
| 2020/0364545 A1* | 11/2020 | Shattil | G06N 3/08 |

OTHER PUBLICATIONS

Chul Min Lee et al., "DNN-based Residual Echo Suppression", Interspeech, Sep. 6-10, 2015, pp. 1775-1779, Dresden, Germany.
Amin Fazel et al., "Deep Multitask Acoustic Echo Cancellation", Interspeech, Sep. 15-19, 2019, pp. 4250-4254, Graz, Austria, http://dx.doi.org/10.21437/Interspeech.2019-2908.
U.S. Appl. No. 62/825,681, entitled Acoustic Echo Cancellation Using Context-Aware Multi-Task Gated Recurrent Neural Networks, filed Mar. 28, 2019, 5 pages.
Appendix A of U.S. Appl. No. 62/914,875, entitled System and Method for Acoustic Echo Cancellation Using Deep Multitask Recurrent Neural Networks, filed Oct. 14, 2019, 5 sheets.
Appendix B of U.S. Appl. No. 62/914,875, entitled System and Method for Acoustic Echo Cancellation Using Deep Multitask Recurrent Neural Networks, filed Oct. 14, 2019, 5 sheets.
D.A. Bendersky, et al., "Nonlinear Residual Acoustic Echo Suppression for High Levels of Harmonic Distortion," in *ICASSP*, 2008, 4 pages.
H. Zhang, et al., "Deep Learning for Joint Acoustic Echo and Noise Cancellation with Nonlinear Distortions," in *INTERSPEECH*, 2019, pp. 4255-4259.
J. Chung, et al., "Empirical Evaluation of Gated Recurrent Neural Networks on Sequence Modeling," In *NIPS Workshop on Deep Learning*, 2014, 9 pages.
A. Vaswani, et al., "Attention Is All You Need," in *Advances in Neural Information Processing Systems*, 31st Conference on Neural Information Processing Systems, 2017, 11 pages.
S. Malik et al., "State-Space Frequency-Domain Adaptive Filtering for Nonlinear Acoustic Echo Cancellation," *IEEE* Trans. Audio. Speech. Lang. Processing, vol. 20, No. 7, pp. 2065-2079, 2012.
M. Jeub, et al., "Do We Need Dereverberation for Hand-Held Telephony?," in *Proceedings of 20th International Congress on Acoustics*, 2010, pp. 1-7.
J.B. Allen, et al., "Image Method for Efficiently Simulating Small-Room Acoustics," *Acoust. Soc. Am. J.*, vol. 65, pp. 943-950, Apr. 1979.
S. J. Reddi, et al., "On the Convergence of Adam and Beyond," in ICLR, 2018, 23 pages.
X. Glorot, et al., "Understanding the Difficulty of Training Deep Feedforward Neural Networks," in *Proceedings of the Thirteenth International Conference on Artificial Intelligence and Statistics*, 2010, vol. 9, pp. 249-256.
C. Faller, et al., "Suppressing Acoustic Echo in a Spectral Envelope Space," *IEEE Trans. Speech Audio Process.*, vol. 13, No. 5, pp. 1048-1061, 2005.
V. Turbin, et al., "Comparison of Three Post-Filtering Algorithms for Residual Acoustic Echo Reduction," in *ICASSP*, 1997, vol. 1, pp. 307-310.
D. Bahdanau, et al., "Neural Machine Translation by Jointly Learning to Align and Translate," in *ICLR*, 2015, 15 pages.
J. Chorowski, et al., "Attention-Based Models for Speech Recognition," in *Proceedings of the 28th International Conference on Neural Information Processing Systems*, 2015, 9 pages.
G. Hinton, et al., "Deep Neural Networks for Acoustic Modeling in Speech Recognition," *IEEE Signal Process. Mag.*, vol. 29, pp. 82-97.
X. Lu, et al., "Speech Enhancement Based on Deep Denoising Autoencoder," in *INTERSPEECH*, 2012, pp. 436-440.
Y. Wang, et al., "Towards Scaling up Classification-Based Speech Separation," *IEEE Trans. Audio. Speech. Lang. Processing*, vol. 21, No. 7, 2013, 10 pages.
Y. Xu, et al., "An Experimental Study on Speech Enhancement Based on Deep Neural Networks," *IEEE Signal Process. Lett.*, vol. 21, No. 1, 4 pages, Jan. 2014.
K. Cho, et al., "Learning Phrase Representations Using RNN Encoder-Decoder for Statistical Machine Translation," in *Proceedings of the Conference on Empirical Methods in Natural Language Processing*, 2014, 15 pages.
Luong et al., "Effective Approaches to Attention-based Neural Machine Translation," in *Proceedings of the Conference on Empirical Methods in Natural Language Processing*, 2015, 11 sheets.
G. Hinton, et al., "Distilling the Knowledge in a Neural Network," in *NIPS Deep Learning and Representation Learning Workshop*, 2015.
R. Martin et al., "The Echo Shaping Approach to Acoustic Echo Control," *Speech Commun.*, vol. 20, No. 3-4, pp. 181-190, 1996.
M. Jeub, et al., "A Binaural Room Impulse Response Database for the Evaluation of Dereverberation Algorithms," in *International Conference on Digital Signal Processing*, 2009.
Andreas Schwarz, et al., "Spectral Feature-Based Nonlinear Residual Echo Suppression", IEEE Workshop on Applications of Signal Processing to Audio and Acoustics, Oct. 20-23, 2013, 4 pgs, New Paltz, NY.
Andreas Schwarz, et al., "Combined Nonlinear Echo Cancellation and Residual Echo Suppression", ITG-Fachbericht 252: Speech Communication, Sep. 24-26, 2014, Print ISBN:978-3-8007-3640-9, Sep. 26, 2014, 4 pgs, Erlangen, Germany.
Guillaume Carbajal et al., "Multiple-Input Neural Network-Based Residual Echo Suppression", 2018 IEEE International Conference on Acoustics, Speech and Signal Processing (ICASSP): Apr. 15-20,

(56) References Cited

OTHER PUBLICATIONS

2018, Electronic ISBN: 978-1-5386-4658-8 Electronic ISSN: 2379-190X DOI:10.1109/ICASSP.2018.8461476, pp. 231-235, Apr. 20, 2018.

Hao Zhang, et al., "Deep Learning for Acoustic Echo Cancellation in Noisy and Double-Talk Scenarios", Proceedings of the Annual Conference of the International Speech Communication Association, Sep. 2, 2018-Sep. 6, 2018, pp. 3239-3243, INTERSPEECH 2018: Speech Research for Emerging Markets in Multilingual Societies, Hyderabad, India.

A.N. Birkett, et al., "Acoustic Echo Cancellation for Hands-Free Telephony using Neural Networks", Proceedings of IEEE Workshop on Neural Networks for Signal Processing Date of Conference: Sep. 6-8, 1994, Print ISBN: 0-7803-2026-3 DOI:10.1109/NNSP.1994.366042, pp. 249-258, Sep. 8, 1994.

Sheng Zhang, et al. "Recursive Adaptive Sparse Exponential Functional Link Neural Network for Nonlinear AEC n Impulsive Noise Environment", IEEE Transactions on Neural Networks and Learning Systems (vol. 29, Issue: 9, Sep. 2018), Electronic ISSN: 2162-2388 DOI: 10.1109/TNNLS.2017.2761259, pp. 4314-4323, Nov. 7, 2017.

* cited by examiner

SYSTEM AND METHOD FOR ACOUSTIC ECHO CANCELATION USING DEEP MULTITASK RECURRENT NEURAL NETWORKS

CROSS-REFERENCE TO RELATED APPLICATION(S)

This application is a continuation of U.S. patent application Ser. No. 16/573,573, filed Sep. 17, 2019, which claims priority to and the benefit of U.S. Provisional Patent Application No. 62/825,681, filed in the United States Patent and Trademark Office on Mar. 28, 2019 and of U.S. Provisional Patent Application No. 62/838,146, filed in the United States Patent and Trademark Office on Apr. 24, 2019, the entire disclosures of all of which are incorporated by reference herein.

FIELD

Aspects of embodiments of the present disclosure relate to the field of audio signal processing, including specifically a system and method for providing acoustic echo cancellation using deep multitask recurrent neural networks.

BACKGROUND

During a real-time or near real-time audio or videoconferencing interactions, a far-end participant may notice acoustic echoes in the signal received from a near-end participant. Acoustic echoes may be generated when a far-end signal playing out of a near-end loudspeaker is coupled back to a microphone at the near-end. When the signal from the near-end microphone is transmitted to the far-end, the far-end user hears a mixture of a near-end signal (e.g., speech from the near-end participant) and a delayed and modified version of their own far-end voice as the acoustic echo. An acoustic echo canceller (AEC) or acoustic echo suppressor (AES) attempts to reduce or remove this echo while avoiding distorting the speech of the near-end user (e.g., without distorting the near-end signal).

SUMMARY

Aspects of embodiments of the present disclosure relate to cancelling acoustic echoes in an audio communication system using deep multitask recurrent neural networks.

According to one embodiment, a method for performing echo cancellation includes: receiving a far-end signal from a far-end device at a near-end device; recording a microphone signal at the near-end device, the microphone signal including: a near-end signal; and an echo signal corresponding to the far-end signal; extracting a plurality of far-end features from the far-end signal; extracting a plurality of microphone features from the microphone signal; computing a plurality of estimated near-end features from the microphone signal by supplying the microphone features and the far-end features to an acoustic echo cancellation module including: an echo estimator including a first stack of a recurrent neural network configured to compute a plurality of estimated echo features based on the far-end features; and a near-end estimator including a second stack of the recurrent neural network configured to compute the estimated near-end features based on an output of the first stack and the microphone signal; computing an estimated near-end signal from the estimated near-end features; and transmitting the estimated near-end signal to the far-end device.

The far-end features supplied to the echo estimator and near-end estimator may include a current frame of far-end features and a causal window of a plurality of previous frames of far-end features, and the microphone features supplied to the near-end estimator may include a current frame of microphone features and the causal window of a plurality of previous frames of microphone features.

The estimated echo features may include a current frame of echo features and the causal window of a plurality of previous frames of echo features, the estimated near-end features may include a current frame of estimated near-end features and the causal window of a plurality of previous frames of estimated near-end features, and the recurrent neural network may be trained by iteratively training a plurality of parameters configuring the echo estimator and the near-end estimator to minimize: differences between the estimated echo features and a plurality of ground truth echo features of a plurality of training data; and differences between the estimated near-end features and a plurality of ground truth near-end features of the plurality of training data.

The minimizing may be performed based on a loss function:

$$\text{loss}_k = \beta \Sigma_{n=0}^{m} \|\tilde{S}_{k-n} - \tilde{Q}_{k-n}\|_1 + (1-\beta) \Sigma_{n=0}^{m} \|\tilde{Y}_{k-n} - \tilde{V}_{k-n}\|_1,$$

wherein m is a length of the causal window, $\tilde{S}_i$ corresponds to the ground truth near-end features for an i-th frame, $\tilde{Q}_i$ corresponds to the estimated near-end features for the i-th frame, $\tilde{Y}_i$ corresponds to the ground truth echo features for the i-th frame, $\tilde{V}_i$ corresponds to the estimated echo features for the i-th frame, and $\beta$ is a weighing factor between the loss associated with the near-end signal and the loss associated with the echo signal.

The training data may be generated by: loading a corpus of training data including recorded utterances from a plurality of different human speakers; selecting a plurality of pairs of human speakers; for each pair of human speakers: concatenating multiple utterances of a first speaker of the pair of human speakers to generate a training far-end signal; transforming the concatenated utterances to simulate an acoustic path to generate a training echo signal; padding an utterance of a second speaker of the pair of human speakers to generate a training near-end signal having a length equal to the training far-end signal; and mixing the training echo signal with the training near-end signal to generate a training microphone signal.

The transforming the concatenated utterances may include convolving the far-end signal with a room impulse response of a simulated room.

The transforming the concatenated utterances may include: applying hard clipping to the far-end signal to generate a clipped far-end signal; and applying sigmoidal distortion to the clipped far-end signal.

The far-end features, the microphone features, the estimated near-end features, and the estimated echo features may include log short time Fourier transform features in logarithmic spectral space.

The first stack may include a first plurality of layers of gated recurrent units, the plurality of estimated echo features may correspond to outputs of a last layer of the first plurality of layers of gated recurrent units, the second stack may include a second plurality of layers of gated recurrent units and a fully connected layer connected to a last layer of the second plurality of layers of gated recurrent units, and the estimated near-end features may to an output of the fully connected layer of the second stack.

According to one embodiment, a communication device configured to perform echo cancellation includes: a modem; a speaker; a microphone; a processor; and memory storing instructions that, when executed by the processor, cause the processor to: receive a far-end signal from a far-end device via the modem; record a microphone signal through the microphone, the microphone signal including: a near-end signal; and an echo signal corresponding to the far-end signal; extract a plurality of far-end features from the far-end signal; extract a plurality of microphone features from the microphone signal; compute a plurality of estimated near-end features from the microphone signal by supplying the microphone features and the far-end features to an acoustic echo cancellation module including: an echo estimator including a first stack of a recurrent neural network configured to compute a plurality of estimated echo features based on the far-end features; and a near-end estimator including a second stack of the recurrent neural network configured to compute the estimated near-end features based on an output of the first stack and the microphone signal; compute an estimated near-end signal from the estimated near-end features; and transmit the estimated near-end signal to the far-end device via the modem.

The far-end features supplied to the echo estimator and near-end estimator may include a current frame of far-end features and a causal window of a plurality of previous frames of far-end features, and the microphone features supplied to the near-end estimator may include a current frame of microphone features and the causal window of a plurality of previous frames of microphone features.

The estimated echo features may include a current frame of echo features and the causal window of a plurality of previous frames of echo features, the estimated near-end features may include a current frame of estimated near-end features and the causal window of a plurality of previous frames of estimated near-end features, and the recurrent neural network may be trained by iteratively training a plurality of parameters configuring the echo estimator and the near-end estimator to minimize: differences between the estimated echo features and a plurality of ground truth echo features of a plurality of training data; and differences between the estimated near-end features and a plurality of ground truth near-end features of the plurality of training data.

The minimizing may be performed based on a loss function:

$$\text{loss}_k = \beta \Sigma_{n=0}^{m} \|\tilde{S}_{k-n} - \tilde{Q}_{k-n}\|_1 + (1-\beta) \Sigma_{n=0}^{m} \|\tilde{Y}_{k-n} - \tilde{V}_{k-n}\|_1,$$

wherein m is a length of the causal window, $\tilde{S}_i$ corresponds to the ground truth near-end features for an i-th frame, $\tilde{Q}_i$ corresponds to the estimated near-end features for the i-th frame, $\tilde{Y}_i$ corresponds to the ground truth echo features for the i-th frame, $\tilde{V}_i$ corresponds to the estimated echo features for the i-th frame, and $\beta$ is a weighing factor between the loss associated with the near-end signal and the loss associated with the echo signal.

The training data may be generated by: loading a corpus of training data including recorded utterances from a plurality of different human speakers; selecting a plurality of pairs of human speakers; for each pair of human speakers: concatenating multiple utterances of a first speaker of the pair of human speakers to generate a training far-end signal; transforming the concatenated utterances to simulate an acoustic path to generate a training echo signal; padding an utterance of a second speaker of the pair of human speakers to generate a training near-end signal having a length equal to the training far-end signal; and mixing the training echo signal with the training near-end signal to generate a training microphone signal.

The transforming the concatenated utterances may include convolving the far-end signal with a room impulse response of a simulated room.

The transforming the concatenated utterances may include: applying hard clipping to the far-end signal to generate a clipped far-end signal; and applying sigmoidal distortion to the clipped far-end signal.

The far-end features, the microphone features, the estimated near-end features, and the estimated echo features may include log short time Fourier transform features in logarithmic spectral space.

The first stack may include a first plurality of layers of gated recurrent units, the plurality of estimated echo features may correspond to outputs of a last layer of the first plurality of layers of gated recurrent units, the second stack may include a second plurality of layers of gated recurrent units and a fully connected layer connected to a last layer of the second plurality of layers of gated recurrent units, and the estimated near-end features may correspond to an output of the fully connected layer of the second stack.

According to one embodiment, a non-transitory computer readable medium stores instructions that, when executed by a computer processor, cause the computer processor to: receive a far-end signal from a far-end device; record a microphone signal through a microphone, the microphone signal including: a near-end signal; and an echo signal corresponding to the far-end signal; extract a plurality of far-end features from the far-end signal; extract a plurality of microphone features from the microphone signal; compute a plurality of estimated near-end features from the microphone signal by supplying the microphone features and the far-end features to an acoustic echo cancellation module including: an echo estimator including a first stack of a recurrent neural network configured to compute a plurality of estimated echo features based on the far-end features; and a near-end estimator including a second stack of the recurrent neural network configured to compute the estimated near-end features based on an output of the first stack and the microphone signal; compute an estimated near-end signal from the estimated near-end features; and transmit the estimated near-end signal to the far-end device.

The far-end features supplied to the echo estimator and near-end estimator may include a current frame of far-end features and a causal window of a plurality of previous frames of far-end features, the microphone features supplied to the near-end estimator may include a current frame of microphone features and the causal window of a plurality of previous frames of microphone features, the estimated echo features may include a current frame of echo features and the causal window of a plurality of previous frames of echo features, the estimated near-end features may include a current frame of estimated near-end features and the causal window of a plurality of previous frames of estimated near-end features, and the recurrent neural network may be trained by iteratively training a plurality of parameters configuring the echo estimator and the near-end estimator to minimize: differences between the estimated echo features and a plurality of ground truth echo features of a plurality of training data; and differences between the estimated near-end features and a plurality of ground truth near-end features of the plurality of training data.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1A:
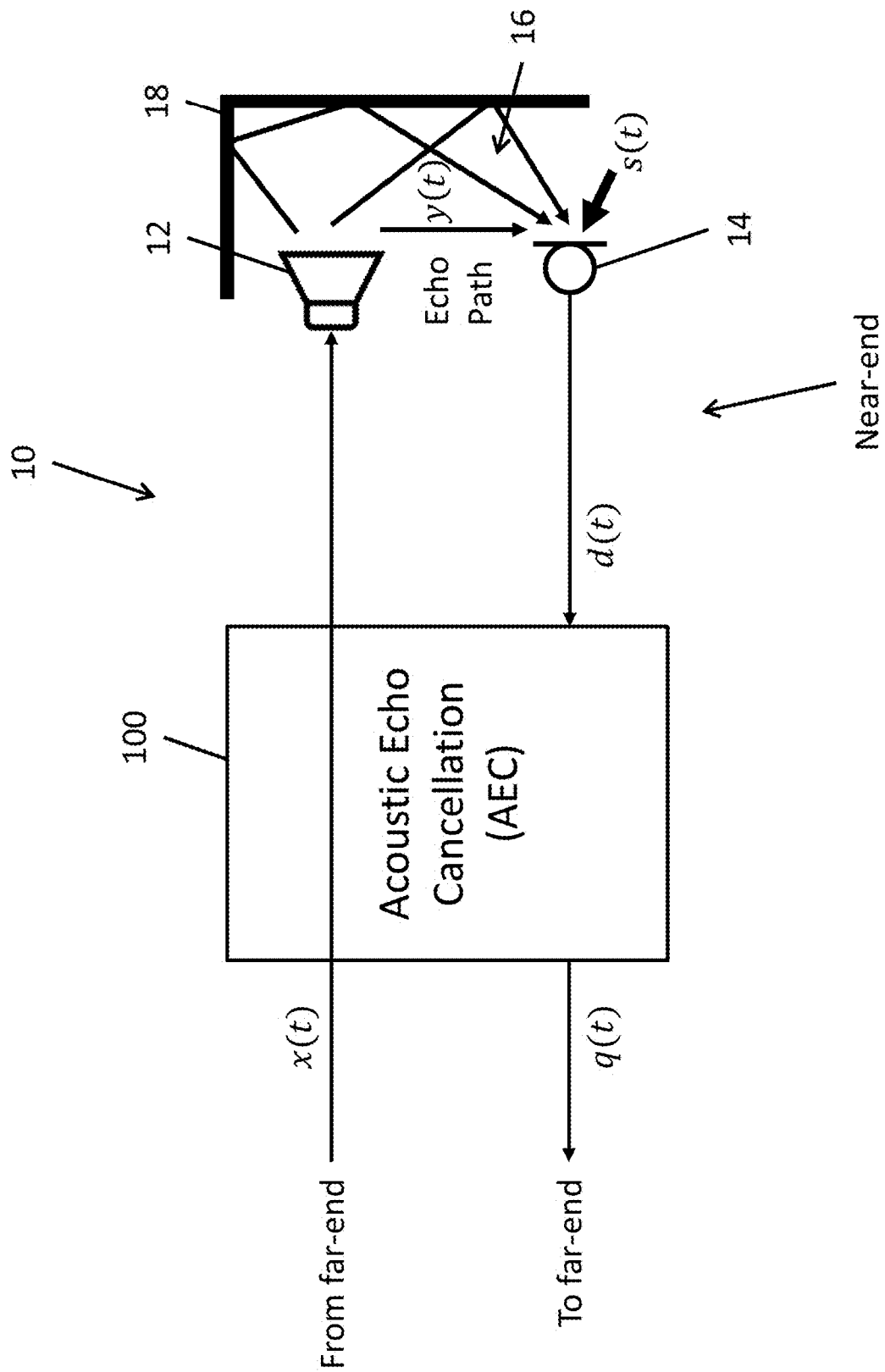
FIG. 1A is a schematic diagram illustrating a communication system including an acoustic echo cancellation (AEC) module configured to reduce or remove acoustic echoes.

In the following detailed description, only certain exemplary embodiments of the present disclosure are shown and described, by way of illustration. As those skilled in the art would recognize, the disclosure may be embodied in many different forms and should not be construed as being limited to the embodiments set forth herein. In the figures and the below discussion, like reference numerals refer to like components.

FIG. 1A is a schematic diagram illustrating a communication system including an acoustic echo cancellation (AEC) module configured to reduce or remove acoustic echoes. As shown in FIG. 1A, a far-end signal x(t) is received and played back on a near-end loudspeaker 12 of a near-end communication device 10. Generally, the far-end signal x(t) contains speech from a far-end user or participant in the interaction. As such, for the sake of convenience, the far-end signal x(t) may sometimes be referred to herein as "far-end speech." The sound produced by the near-end loudspeaker 12 may be detected by a near-end microphone 14 as acoustic echoes y(t), and the sound may travel to the near-end microphone 14 on multiple different echo paths 16, such as after the sounds bounce off walls and other surfaces 18 in a physical environment in which the near-end device 10 is located. The near-end microphone 14 may also detect desired near-end signal s(t), such as speech from a near-end user or participant in the interaction. The signal d(t) produced by the near-end microphone 14 therefore may contain both the desired near-end signal s(t) and the undesired acoustic echoes y(t). The microphone signal d(t) is provided to the acoustic echo cancellation (AEC) module 100, which attempts to remove the echo signal y(t) and to produce an output signal q(t) that approximates the desired near-end signal s(t) (e.g., corresponds to the microphone signal d(t) with the acoustic echoes y(t) removed). The processed the output signal q(t) can then be sent to the far-end as an estimate of the desired near-end signal s(t) with the echo signal y(t) removed.

For the sake of clarity, as used herein, given v(t) as an arbitrary time-domain signal at time t: the short-time Fourier transform (STFT) complex-valued spectrum of v(t) at frame k and frequency bin f is denoted by $V_{k,f}$; its phase is denoted by $\angle V_{k,f}$; and its logarithmic magnitude is denoted by $\tilde{V}_{k,f}$; $\tilde{V}_k$ represents the vector of logarithmic magnitudes at all frequency bins f and frame k.

Figure 1B:
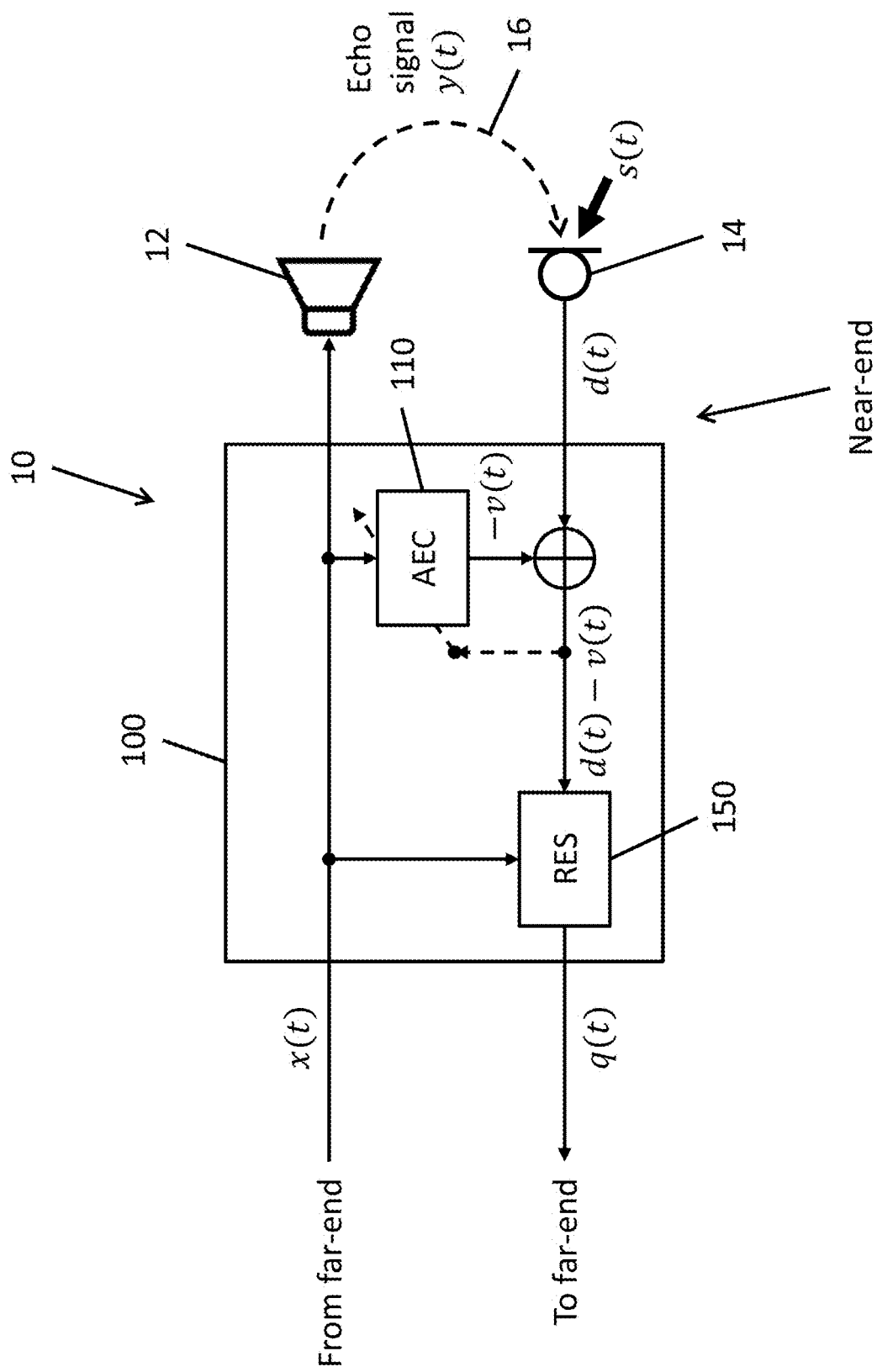
FIG. 1B is a schematic diagram illustrating a communication system including an acoustic echo cancellation (AEC) module and a residual echo suppression (RES) module configured to reduce or remove acoustic echoes.

FIG. 1B is a schematic diagram illustrating a communication system including an acoustic echo cancellation (AEC) module and a residual echo suppression (RES) module configured to reduce or remove acoustic echoes. The microphone signal d(t) includes near-end speech signal s(t) and acoustic echo y(t):

$$d(t)=s(t)+y(t)$$

In some embodiments, the microphone signal d(t) also includes other components such as additive noise n(t) (e.g., d(t)=s(t)+y(t)+n(t)). The acoustic echo signal y(t) is a modified version of far-end speech signal x(t) and includes room impulse response (RIR) and loudspeaker distortion, both of which may cause nonlinearities in the relationship between x(t) and y(t).

Broadly, the acoustic echo cancellation (AEC) problem is to retrieve the clean near-end signal s(t) after removing acoustic echoes due to detection of the far-end signal x(t) by the near-field microphone 14. Comparative systems, as shown in FIG. 1B, estimate a model of the echo path with a linear adaptive filter 110 and then subtract the estimated echo v(t) from the microphone signal d(t). In addition, to enable echo estimation, some comparative AEC methods use a double-talk detector (DTD) to halt the filter adaptation during double-talk periods, when both the near-end and far-end signals are simultaneously present (in contrast to single-talk periods where only the near-end or only the far-end signal is present or non-negligible). Usually, after applying the AEC, there still exists some amount of residual echo at the output of the AEC method (d(t)−v(t)). One of the reasons that comparative AEC methods cannot perfectly remove all the echo noises is that the echo path 16 is not a linear function of the far-end speech signal x(t), even when the echo path 16 is perfectly linear. For example, the audio amplifier (e.g., a power amplifier) and loudspeaker 12 can cause nonlinearities in the relationship between the far-end speech signal x(t) and the echo signal y(t). In addition, the length of the adaptive linear filter may not be sufficient to remove longer echoes (e.g., in large rooms or hallways). Accordingly, a residual echo suppressor (RES) 150 can be further applied to improve the near-end signal, where the RES may be realized by Wiener filter or spectral subtraction in the frequency domain. The final output of AEC system is estimated near-end signal q(t).

Aspects of embodiments of the present disclosure relate to the recurrent neural network (RNN) architectures for acoustic echo cancellation (AEC). Some embodiments relate to the use of deep gated recurrent unit (GRU) networks (see, e.g., K. Cho, B. van Merriënboer, C. Gulcehre, D. Bandanau, F. Bougares, H. Schwen, and Y. Bengio, "Learning Phrase Representations using RNN Encoder-Decoder for Statistical Machine Translation," in Proc. Empirical Methods in Natural Language Processing, 2014, pp. 1724-1734. and J. Chung, C. Gulcehre, K. Cho, and Y. Bengio, "Empirical evaluation of gated recurrent neural networks on sequence modeling," in Proc. NIPS Deep Learning Workshop, 2014.) in an encoder-decoder architecture to map the spectral features of the microphone signals d(t) and far-end signals x(t) to a hyperspace (e.g., a feature space such as logarithmic spectral space), and then decode the target spectral features of the near-end signal s(t) from the encoded hyperspace. In some embodiments, the RNN acoustic echo cancellation module is trained using multitask learning to learn an auxiliary task of estimating the echo signal y(t) in order to improve the main task of estimating the clean near-end speech signal s(t) as estimated near-end signal q(t). As discussed in more detail below, experimental results show that embodiments of the present disclosure cancel acoustic echo in both single-talk and double-talk periods with nonlinear distortions without requiring a separate double-talk detector.

Figure 2:
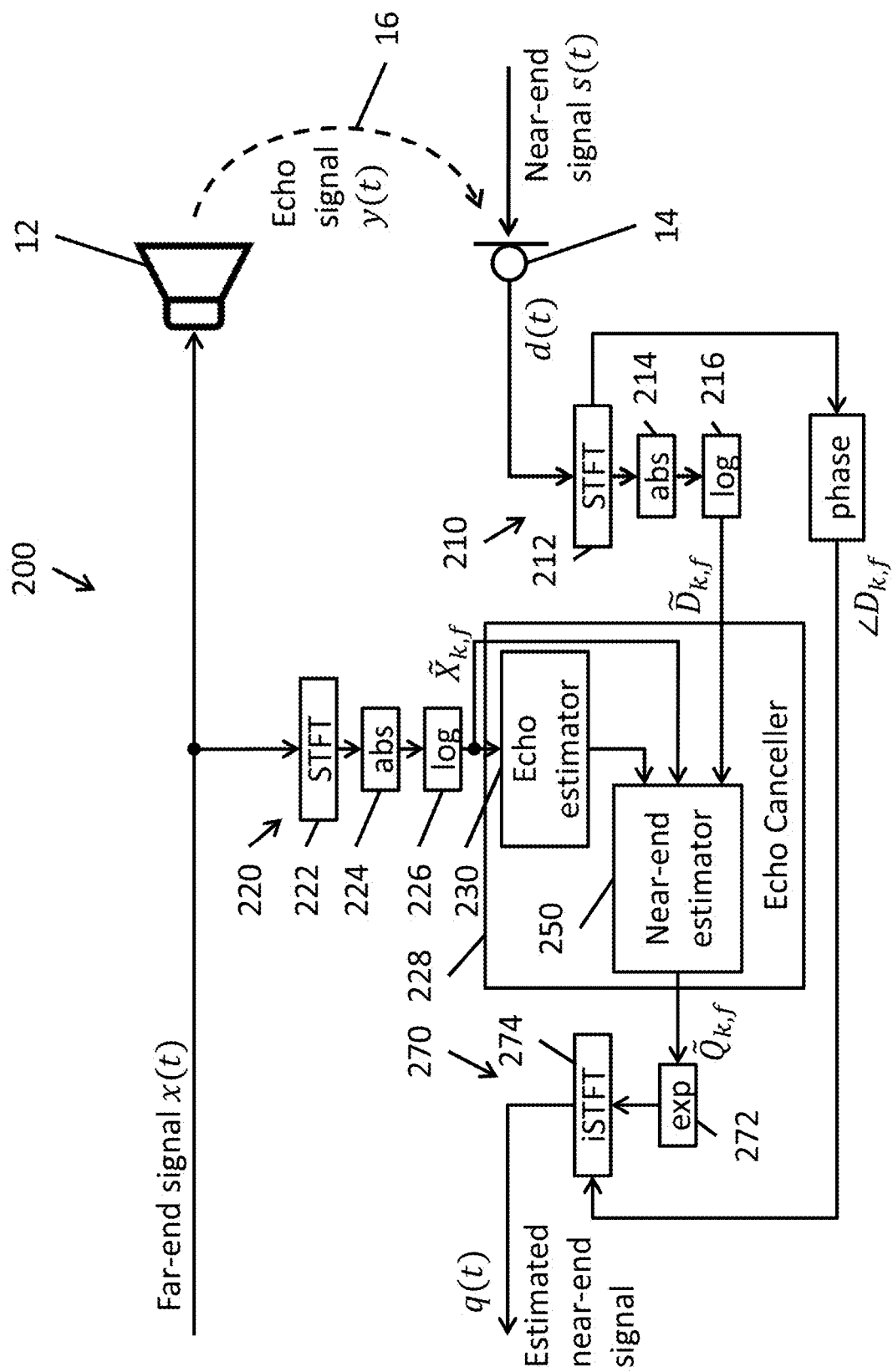
FIG. 2 is a block diagram illustrating an acoustic echo cancellation system according to one embodiment of the present disclosure.

FIG. 2 is a block diagram illustrating an acoustic echo cancellation system 200 according to one embodiment of the present disclosure. As shown in FIG. 2, the microphone signal d(t)=s(t)+y(t) is supplied to the echo cancellation system 200 to cancel or remove the echo signal y(t). For the sake of convenience, aspects of embodiments of the present disclosure will be described herein in the context of audio signals that are sampled at 16 kHz. However, embodiments of the present disclosure are not limited thereto, and may be applied with audio signals sampled at higher rates than 16 kHz or at lower rates than 16 kHz.

In the embodiment shown in FIG. 2, the microphone signal d(t) is supplied to a microphone signal feature extraction module 210, which includes a short time Fourier transform (STFT) module 212, an absolute value module 214 to remove the conjugate symmetric half of the output of the STFT module 212, and a logarithmic operation module 216 to compute the final logarithmic magnitude spectral feature vector or logarithmic spectral features or microphone signal features $\tilde{D}_{k,f}$ in "feature space" or "hyperspace" or "logarithmic spectral space." The STFT module 212 may also compute a phase $\angle D_{k,f}$ of the microphone signal d(t).

For the sake of convenience, aspects of embodiments of the present disclosure will be described herein where the spectral feature vectors are computed using a 512-point short time Fourier transform (STFT) with a frame shift of 256-point (given the 16 kHz sampling rate, each frame corresponds to 32 milliseconds with a 16 millisecond shift between frames, resulting is 16 milliseconds of overlap between frames). In some embodiments, the absolute value module 214 reduces the 512-point STFT magnitude vector to 257-point by removing the conjugate symmetric half. In some embodiments, the features (e.g., the microphone signal features $\tilde{D}_{k,f}$) are standardized to have zero mean and unit variance using the scalars calculated from the training data, as discussed in more detail below. As would be understood by one of skill in the art, the spectral feature vectors may be computed with more than 512 points or fewer than 512 points and with longer or shorter frame shifts (e.g., more overlap or less overlap between frames).

In a manner similar to that of comparative systems as discussed above with respect to FIG. 1B, some aspects of embodiments of the present disclosure relate to using the received far-end signal x(t) to estimate an acoustic echo. In more detail, in some embodiments, the far-end signal x(t) may also be applied to a far-end signal feature extraction module 220. In some embodiments, the far-end signal feature extraction module 220 is substantially similar to the microphone signal feature extraction module 210 and includes an STFT module 222, an absolute value module 224, and a logarithmic operation module 226. The far-end signal feature extraction module 220 computes far-end signal features $\tilde{X}_{k,f}$ (in the feature space or hyperspace) from the far-end signal x(t). According to some embodiments of the present disclosure, the far-end signal features $\tilde{X}_{k,f}$ are supplied to an echo estimator 230, which is configured to compute estimated echo features $\tilde{V}_{k,f}$ (in the feature space or hyperspace).

In some embodiments of the present disclosure, a near-end estimator 250 accepts the microphone signal features $\tilde{D}_{k,f}$, the far-end signal features $\tilde{X}_{k,f}$, and the estimated echo features $\tilde{V}_{k,f}$ (or another output of the echo estimator 230) to compute estimated near-end speech features $\tilde{Q}_{k,f}$. The estimated near-end speech features $\tilde{Q}_{k,f}$ may then be supplied to feature inversion module or signal synthesis module 270, which may include an exponential operation module 272 (to invert the logarithmic operation applied to the input signals) and an inverse short time Fourier transform (iSTFT) module 274 to transform the estimated near-end speech features $\tilde{Q}_{k,f}$ from the feature space or hyperspace to a time domain signal q(t), which is an estimate of the near-end speech or near-end signal s(t).

In various speech processing applications, using past and/or future frames of data can help in computing estimates characteristics of the current frame. In some of such speech processing applications, a fixed context window is used as the input to a fully-connected first layer of a deep neural network. In these comparative methods, the contextual information can be lost after this first layer as the information flows through deeper layers.

Accordingly, some aspects of embodiments of the present disclosure use the context features for both inputs and outputs of the neural network in order to keep the contextual information available throughout the neural network. According to some embodiments, the input features for a current frame includes the feature vector $\tilde{X}_k$ of current frame k and feature vectors ($\tilde{X}_{k-1}, \tilde{X}_{k-2}, \ldots, \tilde{X}_{k-6}$) of six previous frames or causal frames (k−1, k−2, …, k−6). According to some embodiments of the present disclosure, causal windows (using only data from previous frames, as opposed to future frames) are chosen to prevent extra latency (e.g., when using causal windows of frames there is no need to wait for the arrival of future frames k+1, k+2, … before processing a current frame k). The seven frames with 50% overlap of the embodiment discussed above creates a receptive filed of 112 ms, which is generally long enough for processing the speech signal. To incorporate context awareness, some aspects of embodiments of the present disclosure relate to the use of unrolled deep gated recurrent unit (GRU) networks with seven time-steps (or frames) for both the echo estimation module and the near-end estimation module. However, embodiments of the present disclosure are not limited thereto and may be implemented with more than six prior frames of data or fewer than six prior frames of data.

Figure 3:
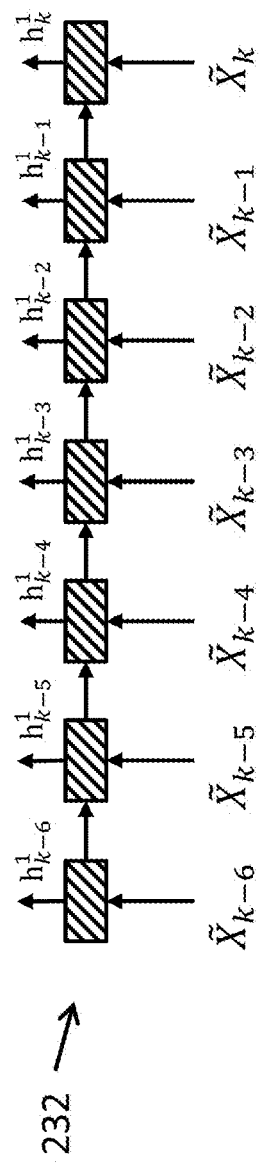
FIG. 3 is a block diagram illustrating an input layer of an unrolled deep gated recurrent unit (GRU) network according to one embodiment of the present disclosure.

FIG. 3 is a block diagram illustrating an input layer of an unrolled deep gated recurrent unit (GRU) network according to one embodiment of the present disclosure. As shown in FIG. 3, each of seven GRUs 232 receives a corresponding input feature vector from the feature vectors corresponding to the current frame $\tilde{X}_k$ and the six previous frames $\tilde{X}_{k-1}$, $\tilde{X}_{k-2}, \ldots, \tilde{X}_{k-6}$. Each of the seven GRUs 232 computes a hidden feature vector or activation h. For example, the GRU 232 corresponding to the k–6th frame receives the corresponding feature vector $\tilde{X}_{k-6}$ and computes activation $h_{k-6}^1$. The activation from each prior GRU 232 is supplied to the next GRU in the sequence. For example, activation $h_{k-6}^1$ from the GRU corresponding to the k–6th frame is supplied as an input to the GRU for the k–5th frame. Accordingly, the GRU for the k–5th frame computes its activation $h_{k-5}^1$ from its corresponding input feature vector $\tilde{X}_{k-5}$ and the activation $h_{k-6}^1$ from the previous frame. This recurrent arrangement allows contextual information from prior frames to be used when processing a current frame.

According to some embodiments of the present disclosure, each GRU computes its output activation in accordance with:

$$h_k = (1-z_k) \odot h_{k-1} + z_k \odot \hat{h}_k$$

where $\odot$ is an element-wise multiplication, and the update gates $z_k$ are:

$$z_k = \sigma(W_z \tilde{X}_k + U_z h_{k-1})$$

where σ is a sigmoid function. The candidate hidden state $\hat{h}_k$ is computed by $$\hat{h}_k = elu(W\tilde{X}_k + U(r_k \odot h_{k-1}))$$

where elu is exponential linear unit function, and reset gates $r_k$ are computed by $$r_k = \sigma(W_r \tilde{X}_k + U_r h_{k-1})$$

where U, W, $U_r$, $W_r$, $U_z$, and $W_z$ are the internal weight matrices of the GRUs. In some embodiments, each of the GRUs in a given layer (e.g., each of the GRUs in layer 232) uses the same set of weights (hence the "recurrent" nature of the neural network). In some embodiments, the values of the internal weight matrices are learned through a training process, described in more detail below.

Figure 4:
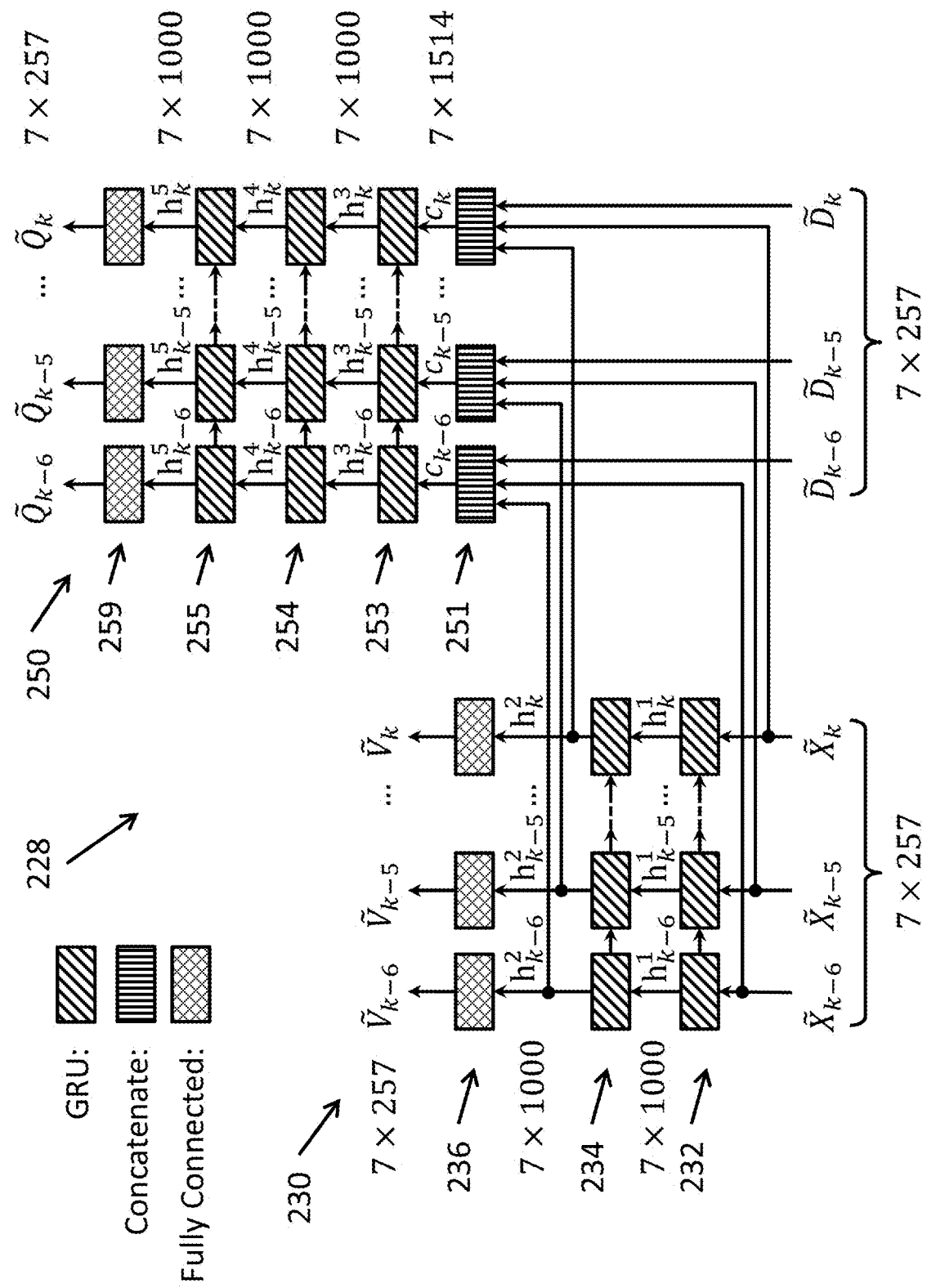
FIG. 4 is a block diagram illustrating an architecture of an acoustic echo cancellation (AEC) neural network according to one embodiment of the present disclosure.

FIG. 4 is a block diagram illustrating an architecture of an acoustic echo cancellation (AEC) neural network 228 according to one embodiment of the present disclosure. In the embodiment shown in FIG. 4, the acoustic echo cancellation (AEC) module includes a deep neural network model that includes two stacked GRU networks. The first stack corresponds to the echo estimator 230 shown in FIG. 2 and takes context-aware frames $\tilde{X}_k$ as inputs to each input layer GRU 232 and estimates echo features $\tilde{V}_k$ using a fully connected (FC) output layer 236 with linear activation. In the embodiment shown in FIG. 4, the first stack includes one hidden GRU layer 234. In more detail, the first GRU layer or input GRU layer 232 computes first activations $h_{k-6}^1$, $h_{k-5}^1, \ldots, h_k^1$, as discussed above with respect to FIG. 3. The first activations are supplied to the second GRU layer 234 to compute second activations $h_{k-6}^2$, $h_{k-5}^2, \ldots, h_k^2$. In the embodiment shown in FIG. 4, the second GRU layer 234 is also the last GRU layer of the stack. As such, the activations of the last GRU layer of the stack (here, the second activations $h_{k-6}^2, h_{k-5}^2, \ldots, h_k^2$) are supplied to the fully connected output layer 236 to compute the estimated echo features $\tilde{V}_{k-6}, \tilde{V}_{k-5}, \ldots, \tilde{V}_k$. However, embodiments of the present disclosure are not limited thereto and may include more than one hidden layer in the neural network of the echo estimator 230. For example, one or more additional GRU layers may be inserted between the input GRU layer 232 and the last GRU layer 234, where each i-th additional layer would compute its own activations $h_{k-6}^i, h_{k-5}^i, \ldots, h_k^i$ based on the activations of the previous layer $h_{k-6}^{i-1}, h_{k-5}^{i-1}, \ldots, h_k^{i-1}$.

In the embodiment shown in FIG. 2, the outputs $h_{k-6}^2$, $h_{k-5}^2, \ldots, h_k^2$ of the last GRU layer 234 from the first stack (the echo estimator 230) are supplied to a concatenation layer 251 to be concatenated with the context-aware frames corresponding to the features of the far-end signal $\tilde{X}_k$ and the features $\tilde{D}_k$ of the microphone signal d(t) to create concatenated inputs c to the first GRU layer 253 of the second stack (the near-end estimator 250). In the embodiment shown in FIG. 4, the second stack (the near-end estimator 250) includes three GRU layers: a third GRU layer 253, a fourth GRU layer 254, and a fifth GRU layer 255, which compute corresponding third activations $h_{k-6}^3, h_{k-5}^3, \ldots, h_k^3$, fourth activations $h_{k-6}^4, h_{k-5}^4, \ldots, h_k^4$, and fifth activations $h_{k-6}^5$, $h_{k-5}^5, \ldots, h_k^5$. The activations from the last of the hidden GRU layers (in the embodiment shown in FIG. 4, fifth activations $h_{k-6}^5, h_{k-5}^5, \ldots, h_k^5$ from the fifth GRU layer 255) are supplied to a fully connected output layer 259 to estimate the context-aware frames $\tilde{Q}_k$ of features of estimated near-end speech. As shown in FIG. 4, the network may also compute the estimated-near-end speech of the prior six frames $\tilde{Q}_{k-6}, \tilde{Q}_{k-5}, \ldots, \tilde{Q}_{k-1}$, which may be used for computing a loss during training in accordance with a loss function, as discussed in more detail below.

As noted above, in the embodiment shown in FIG. 4, data from the current frame k and the six previous frames k–6, k–5, k–1 are used to compute the features of the estimated near-end speech $\tilde{Q}_k$. Also as discussed above, the embodiment shown in FIG. 4 makes use of a 257-point feature vector. Accordingly, altogether, the seven frames of the feature vectors $\tilde{X}_k$ of the far-end signal x(t) have dimensions 7×257. In the embodiment shown in FIG. 4, the activations or outputs h of each of the GRU units is a vector of length 1000, although embodiments of the present disclosure are not limited thereto. Because the embodiment of FIG. 4 uses seven frames of data, the outputs or activations of each of the GRU layers 232 and 234 has dimensions of 7×1000. To match the shape of the input feature vectors, each of the output estimated echo features $\tilde{V}$ has a length of 257, and therefore the output of the fully connected output layer 236 of the echo estimator has dimensions 7×257.

In the embodiment shown in FIG. 4, the microphone signal d(t) is supplied to substantially the same feature extractor as that used with the far-end signal x(t), and therefore the microphone signal features $\tilde{D}$ for each frame are also feature vectors of length 257 values for each frame, such that the seven frames of microphone signal features $\tilde{D}$ result in overall dimensions of 7×257. Each of the concatenation units of the concatenation layer 251 concatenates the output (having length 1000) of the last GRU layer 234 (e.g., output activations $h^2$) of the first stack, the far-end signal features $\tilde{X}$ (having length of 257 values), and the microphone signal features $\tilde{D}$ (having length 257) of a corresponding frame, such that the output c of each of the concatenation units has a length of 1000+257+257=1514, and the output of the concatenation layer 251 has dimensions of 7×1514.

In the embodiment shown in FIG. 4, in a manner similar to that of the echo estimator 230, each GRU layer 253, 254, and 255 of the near-end estimator 250 produces an output activation h of dimensions 7×1000 (e.g., each GRU unit map compute an activation or activation vector having a length of 1000 values), and the final fully connected layer 259 produces feature vectors $\hat{Q}$ (having length 257) of estimated near-end speech of the current frame and the previous six frames, where the dimensions of the output of the fully connected layer 259 are 7×257.

Figure 5A:
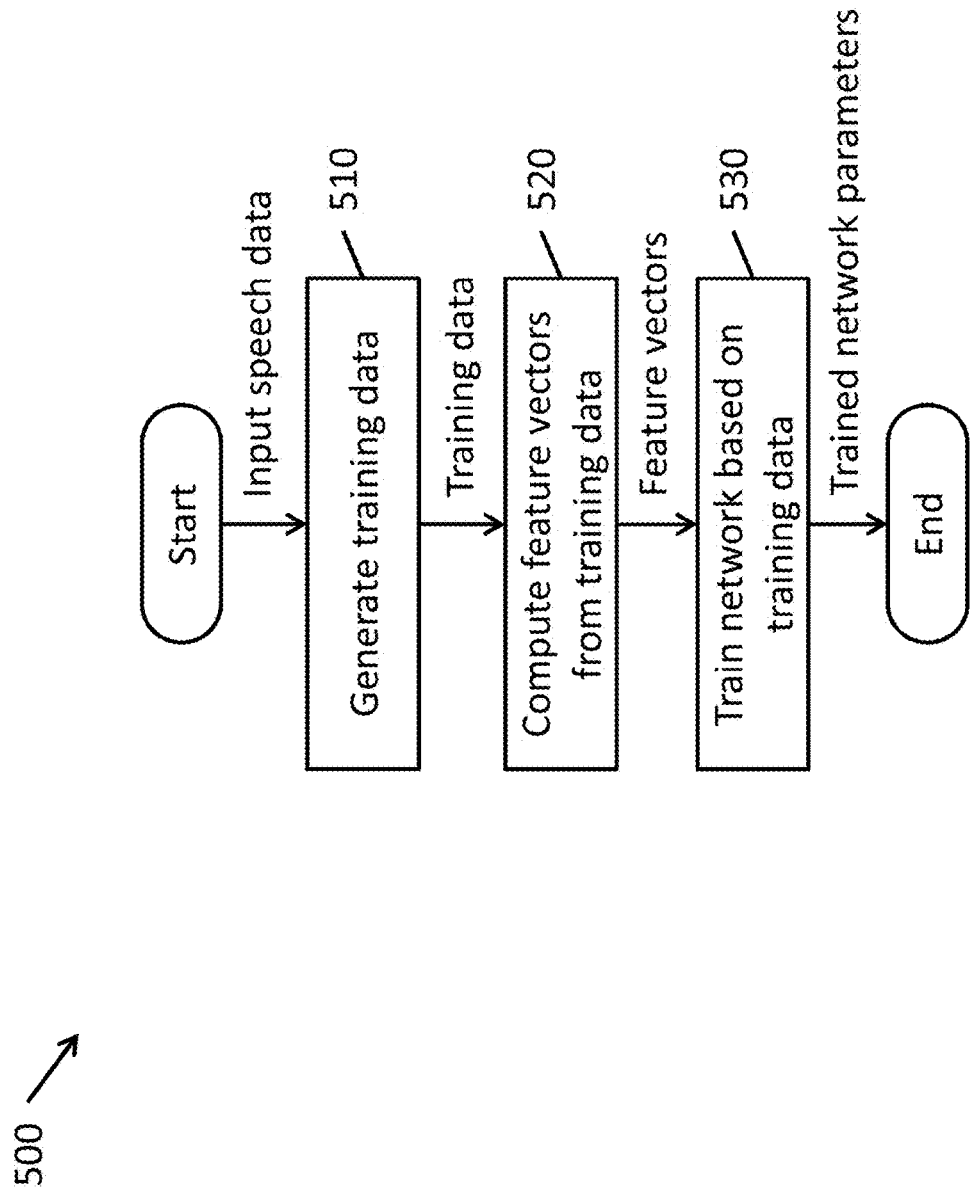
FIG. 5A is a flowchart depicting a method for training a recurrent neural network of an acoustic echo cancellation module according to one embodiment of the present disclosure.

FIG. 5A is a flowchart depicting a method 500 for training a recurrent neural network of an acoustic echo cancellation module according to one embodiment of the present disclosure. Generally, a supervised learning process of training a neural network involves computing various parameters of the neural network, such as weights and biases of neurons of the network, by adjusting the parameters to minimize a loss function between the output of the neural network and the "ground truth" data of a set of labeled training data for given set of inputs in the training data. The training may be performed by a computer system (including a processor and memory, and which may be accelerated using a vector processor such as a graphics processing unit) having access to training data, where the training data may be divided into a training set, a test set, and, in some embodiments, a validation set. Generally, the training set is used to learn the parameters of the network, the validation set is used to determine various hyper-parameters of the network (e.g., architectural parameters such as the number of neurons in each unit and the number of layers in the neural network), and the test set is used to evaluate the overall performance of the trained system.

In the particular domain of acoustic echo cancellation described here, the training data may include: far-end signals x(t); near-end signals s(t); and echo signals y(t). In some embodiments of the present disclosure, at 510, the computer system generates training data in a manner similar to that described in H. Zhang and D. Wang, "Deep Learning for Acoustic Echo Cancellation in Noisy and Double-Talk Scenarios," in Proc. Annual Conference of the International Speech Communication Association, 2018, pp. 3239-3243. In some embodiments, the TIMIT dataset is used to generate the training data (see, e.g., F. Lamel, R. H. Kassel, and S. Seneff, "Speech database development: Design and analysis of the acoustic-phonetic corpus," in Speech Input/Output Assessment and Speech Databases, 1989.).

Figure 5B:
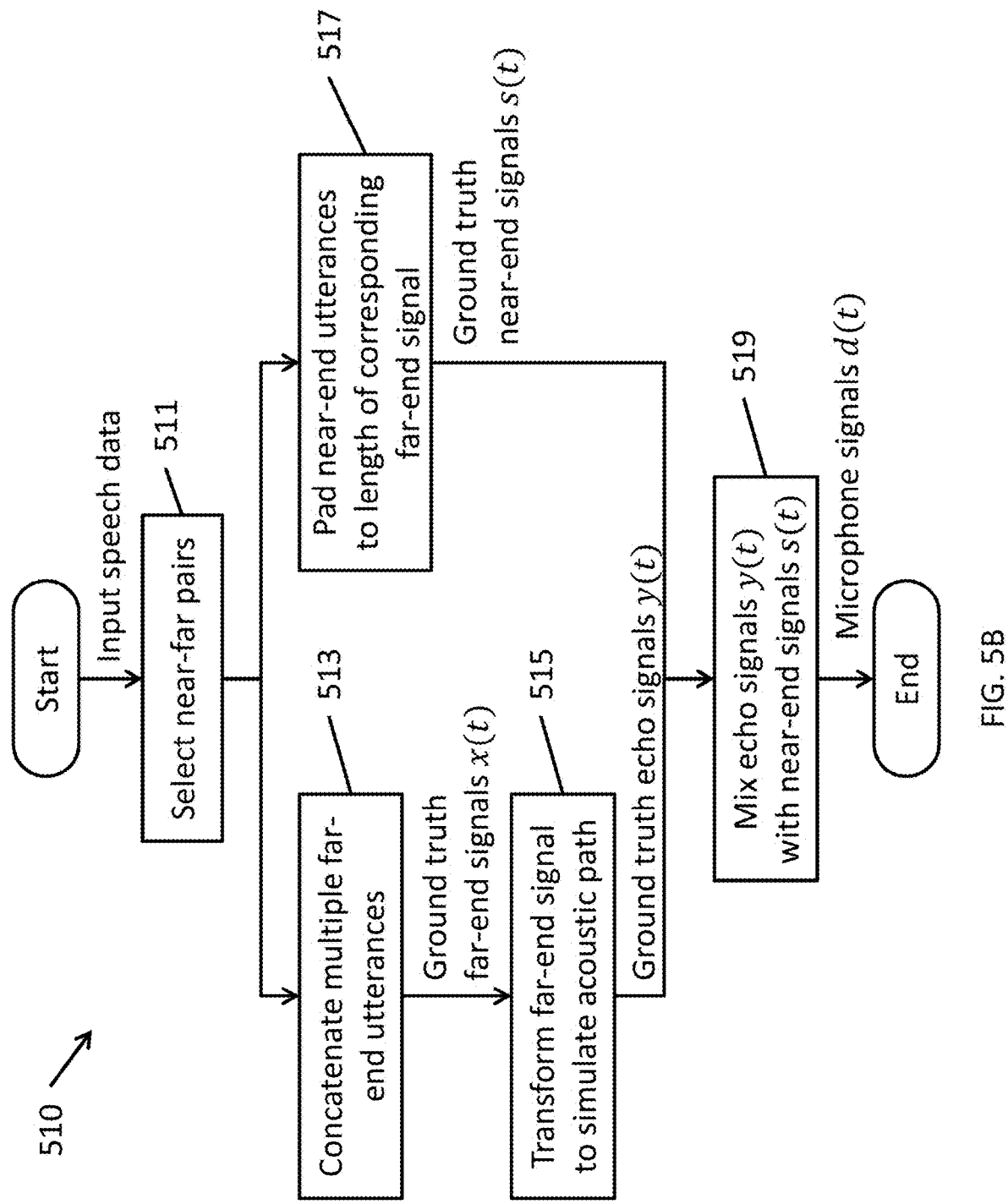
FIG. 5B is a flowchart of a method for generating training data according to one embodiment of the present disclosure.
Figure 5C:
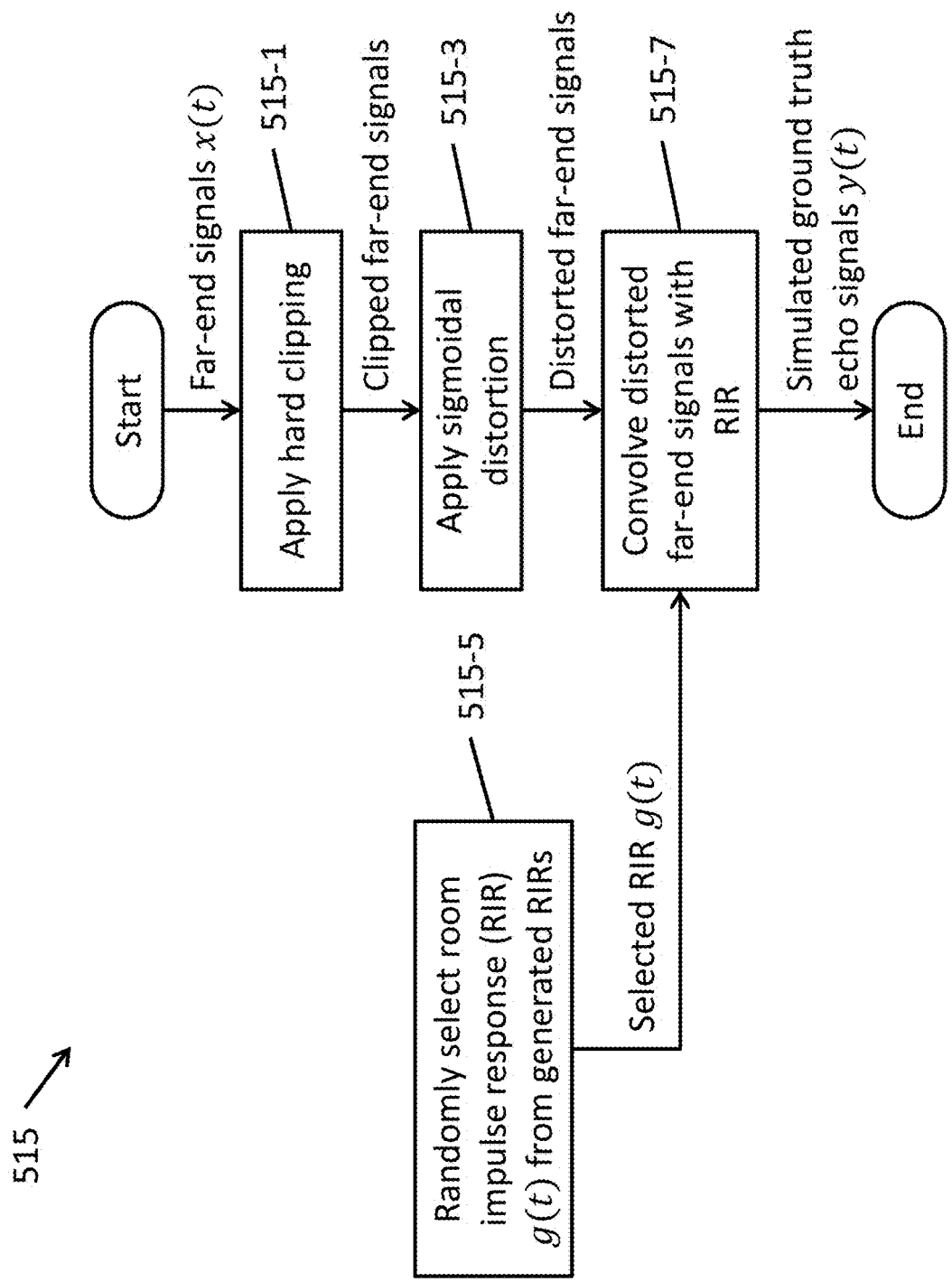
FIG. 5C is a flowchart of a method for generating a simulated echo signal y(t) according to one embodiment of the present disclosure.

FIG. 5B is a flowchart of a method 510 for generating training data according to one embodiment of the present disclosure. In more detail, in some embodiments, the input data set may include recorded speech from a plurality of different human speakers or voices. At 511, a plurality of pairs of human speakers may be chosen (e.g., randomly) to be used as the near-end and far-end speakers. At 513, from each pair, three utterances of the far-end speaker are randomly chosen and concatenated to create a ground truth far-end signal x(t). At 515, for each pair, the far-end signal x(t) is transformed to generate a corresponding echo signal y(t) by simulating the effect of the acoustic path. FIG. 5C, discussed in more detail below, describes a method for generating a simulated ground truth echo signal y(t) according to one embodiment of the present disclosure.

At 517, each utterance of a near-end speaker of the pair is padded or extended to the same length as that of its corresponding far-end signal x(t) (e.g., for each concatenated far-end signal generated in accordance with the paired far-end human speaker) by filling zeroes before and after the utterance to have the same size as the far-end signal to generate ground truth near-end signals s(t). (Embodiments of the present disclosure are not limited thereto, and, in some embodiments, noise is added to the entire padded signal.) In some embodiments, more than one far-end signal x(t) and near-end signal s(t) pair is selected for each near-end far-end pair.

At 519, the computer system mixes (e.g., adds) the ground truth echo signals y(t) and the ground truth near-end signals s(t) computed for each pair to generate a corresponding training microphone signal d(t). For training mixtures, in some embodiments, the computer system generates the training microphone signals d(t) at 519 at signal to echo ratio (SER) level randomly chosen from {−6, −3, 0, 3, 6}dB by mixing the near-end speech signal and echo signal. The SER level is calculated on the double-talk period as:

$$SER(\text{dB}) = 10\log_{10}\frac{E\{s^2(t)\}}{E\{y^2(t)\}}$$

FIG. 5C is a flowchart of a method 515 for generating a simulated or ground truth echo signal y(t) according to one embodiment of the present disclosure in a manner similar to that described in S. Malik and G. Enzner, "State-space frequency-domain adaptive filtering for nonlinear acoustic echo cancellation," IEEE Transactions on audio, speech, and language processing, vol. 20, no. 7, pp. 2065-2079, 2012. For the nonlinear model of acoustic path, at 515-1, the computer system applies hard clipping to simulate the power amplifier of loudspeaker (in one embodiment, $x_{max}$ is set to 80% of the maximum volume of input signal):

$$x_{clip}(t) = \begin{cases} -x_{max} & \text{if } x(t) < -x_{max} \\ x(t) & \text{if } |x(t)| \le x_{max} \\ x_{max} & \text{if } x(t) > x_{max} \end{cases}$$

At 515-3, to simulate the loudspeaker distortion, the computer system applies the a sigmoidal function such as:

$$x_{nl}(t) = 4\left(\frac{2}{1+\exp(-a.b(t))} - 1\right)$$

where $b(t)=1.5x_{clip}(t)-0.3x_{clip}(t)^2$ and $a=4$ if $b(t)>0$ and $a=0.5$ otherwise.

According to one embodiment, at 515-5, a room impulse response (RIR) g(t) is randomly chosen from a set of RIRs, where the length of each of the RIRs is 512, the simulation room size is 4 meters×4 meters×3 meters, and a simulated microphone is fixed at the location of [2 2 1.5] meters (at the center of the room). A simulated loudspeaker is placed at seven random places with 1.5 m distance from the microphone. In some embodiments of the present disclosure, a plurality of different RIRs are also generated with different room sizes and different placements of the simulated microphone and/or simulated speaker.

In some embodiments, the RIRs are generated using an image method (see, e.g., J. B. Allen, D. A. Berkley, "Image method for efficiently simulating small-room acoustics," The Journal of Acoustic Society of America, vol. 65, no. 4, pp. 943-950, 1979.) at reverberation time ($T_{60}$) of 200 ms.

From the generated RIRs, in some embodiments some of the RIRs are used to generate the training data (e.g., may be randomly selected) while others are reserved to generate test data.

At 515-7, the output of sigmoidal function is convolved with the randomly chosen room impulse response (RIR) g(t) in order to simulate the acoustic transmission of the distorted (nonlinear) far-end signal $x_{nl}(t)$ played through the loudspeaker in the room:

$$y_{nl}(t)=x_{nl}(t)*g(t)$$

where * indicates a convolution operation.

In some embodiments, a linear acoustic path $y_{lin}(t)$ is simulated by only convolving the original far-end signal x(t) with the RIR g(t) to generate the echo signal, where nonlinearities such as clipping and loudspeaker distortion are not applied for this model:

$$y_{lin}(t)=x(t)*g(t)$$

Referring back to FIG. 5A, at 520 the computer system computes feature vectors (ground truth near-end features $\tilde{S}$, ground truth far-end features $\tilde{X}$, ground truth echo features $\tilde{Y}$, and microphone features $\tilde{D}$) from respective parts of the training data (ground truth near-end signal s(t), ground truth far-end signal x(t), ground truth echo signal y(t), and the microphone signal d(t)) using the feature extractors as described above.

At 530, the computer system trains the neural network of the AEC 228 in accordance with the training data. In more detail, as discussed above, each of the GRUs computes its corresponding activation h from its inputs based on internal weight matrices U, W, $U_r$, $W_r$, $U_z$, and $W_z$. In addition, each of the fully connected units includes a plurality of internal weights W and biases b (e.g., applying an affine function of the form Wx+b) for mapping the inputs to the fully connected units to the outputs in feature space (e.g., STFT space).

Training the neural network involves learning the internal weights of the GRUs and the fully connected units such that the output feature vectors (estimated near-end features $\tilde{Q}$ and estimated echo features $\tilde{V}$) are close to the ground truth feature vectors (ground truth near-end features $\tilde{S}$ and ground truth echo features $\tilde{Y}$). The difference between the output feature vectors $\tilde{Q}$ and $\tilde{V}$ and the ground truth feature vectors $\tilde{S}$ and $\tilde{Y}$ may be measured using a loss function, representing how well the neural network, as configured with the current set of internal weights, approximates the underlying data.

In one embodiment, a mean absolute error (MAE) loss function is used for training the neural network. A mean absolute error is calculated between a ground-truth source (near-end signal s(t)) and a network estimated output (estimated near-end signal q(t)) in the feature domain (e.g., the STFT domain, as discussed above). Some embodiments use a weighted loss function that accounts for both the near-end signal s(t) and the echo path signal y(t) to compute the network weights. Accordingly, in one embodiment, the loss for a given frame k is computed based on the current frame and the previous six frames in accordance with:

$$loss_k = \beta \sum_{n=0}^{m} \|\tilde{S}_{k-n} - \tilde{Q}_{k-n}\|_1 + (1-\beta) \sum_{n=0}^{m} \|\tilde{Y}_{k-n} - \tilde{V}_{k-n}\|_1$$

where $\beta$ is the weighting factor between the loss associated with the near-end signal and the loss associated with the echo signal, $\tilde{S}_i$ corresponds to the ground truth near-end features for an i-th frame, $\tilde{Q}_i$ corresponds to the estimated near-end features for the i-th frame, $\tilde{Y}_i$ corresponds to the ground truth echo features for the i-th frame, and $\tilde{V}_i$ corresponds to the estimated echo features for the i-th frame. In embodiments where m previous frames of data are used for context (e.g., a causal window of length m frames), the summations run from n=0 to m. For the sake of convenience, in the embodiments described in detail herein, m=6.

In some embodiments of the present disclosure, the weights are computed using gradient descent and backpropagation. In particular, the weights are iteratively adjusted based on the differences between the current output of the neural network and the ground truth. In some embodiments of the present disclosure, the models are trained using AMSGrad optimization (see, e.g., J. Reddi, S. Kale, and S. Kumar, "On the convergence of Adam and beyond," in International Conference on Learning Representations (ICLR), 2018.), and in particular the Adam variant (see, e.g., D. P. Kingma and J. L. Ba, "Adam: a method for stochastic optimization," in International Conference on Learning Representations (ICLR), 2015.) by setting $\beta_1=0.9$, $\beta_2=0.999$, and $\epsilon=10^{-3}$ for 100 epochs, with a batch size of 100. In some embodiments, the weights of all layers are initialized with the Xavier method (see, e.g., X. Glorot, and Y. Bengio, "Understanding the difficulty of training deep feedforward neural networks," in Proc. International Conference on Artificial Intelligence and Statistics, 2010, pp. 249-256.) and with the biases initialized to zero. In some embodiments, L2 regularization for all the weights with a regularization constant of 0.000001 is used to prevent overfitting.

After training the weights of the neural network, the trained network may be tested using the test set of the training data to verify the accuracy of the network. As noted above, the test set may be formed using utterances from speakers who were not used in the training set and/or use RIRs and/or other distortions that were not present in the training set. Accordingly, the test set may be used to evaluate whether that the training process has trained a neural network to perform a generalized function for acoustic echo cancellation, rather than overfitting to the particular characteristics of the training data (e.g., removing acoustic echoes characteristic of the particular human speakers or RIRs of the training data).

After training the neural network and determining that the performance of the trained network is sufficient (e.g., based on the test set), the weights may be saved and used to configure an neural network running on an end-user device such as a smartphone or a tablet computer. In various embodiments of the present disclosure, the neural network of the acoustic echo cancellation module is implemented on at least one processor 1120 of the end-user device 10 (see, e.g., FIG. 10), where the processor may be: a general purpose central processing unit; a graphical processing unit (GPU); a field programmable gate array (FPGA); an neural processing unit (NPU) or neural network processor (NNP) (e.g., a processor having an architecture tailored to perform inference using a neural network); or a neuromorphic processor. For example, the parameters of the neural network (e.g., weights and biases) and the neural network architecture may be stored in non-transitory memory connected to the processor, where the processor performs inference using the network by loading the parameters and network architecture from memory. As another example, in the case of an FPGA, the FPGA may be configured in a non-transitory manner with the network architecture and the weights using a bitfile. Because the training process may be considered to be complete or stable, in some embodiments of the present disclosure, the end-user device may only operate the neural network in inference mode to compute the current estimated near-end features $\tilde{Q}$ or estimated near-end signal q(t).

Figure 6A:
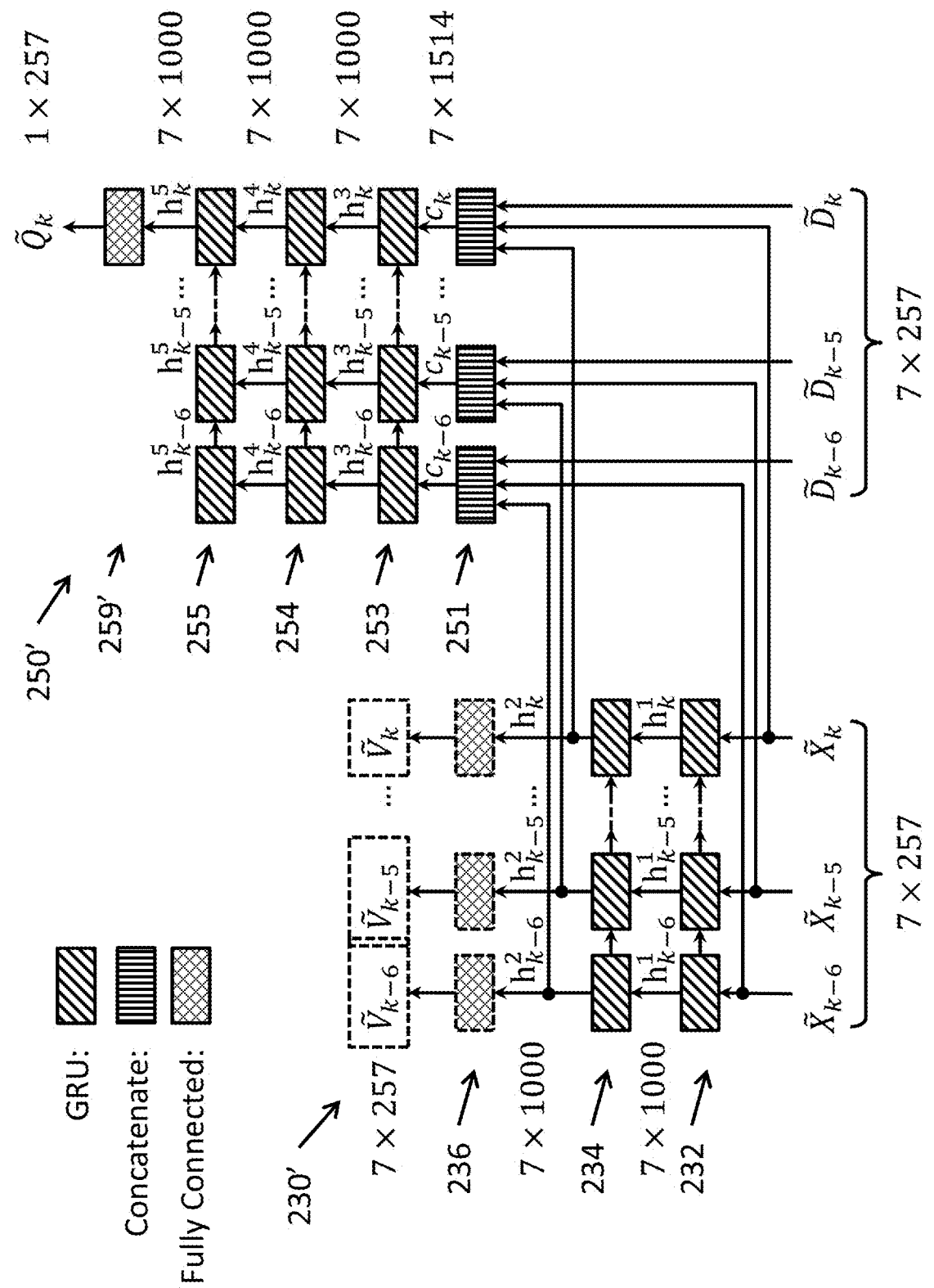
FIG. 6A is a block diagram illustrating an architecture of an acoustic echo cancellation (AEC) neural network operating in inference mode according to one embodiment of the present disclosure.

FIG. 6A is a block diagram illustrating an architecture of an acoustic echo cancellation (AEC) neural network operating in inference mode according to one embodiment of the present disclosure. As shown in FIG. 6A, during inference, it is not necessary to compute the estimated near-end features for the prior frames $\tilde{Q}_{k-6}, \tilde{Q}_{k-5}, \ldots, \tilde{Q}_{k-1}$, e.g., because, when the AEC neural network is used in the field, the near-end device 10 need only compute and transmit the current estimated frame to the far-end (e.g., the prior estimated near-end frames have already been transmitted to the far-end). (During training, the prior frames $\tilde{Q}_{k-6}, \tilde{Q}_{k-5}, \ldots, \tilde{Q}_{k-1}$, were useful for providing additional information to the loss function.) Likewise, as shown in FIG. 6A, the fully connected output layer 236 of the first stack of the echo estimator 230 may be omitted from the inference mode neural network because the second stack of the near-end estimator 250' in inference mode depends only on the output $h_{k-6}^2, h_{k-5}^2, \ldots, h_k^2$ of the last GRU layer 234 of the first stack of the echo estimator 230'.

Figure 6B:
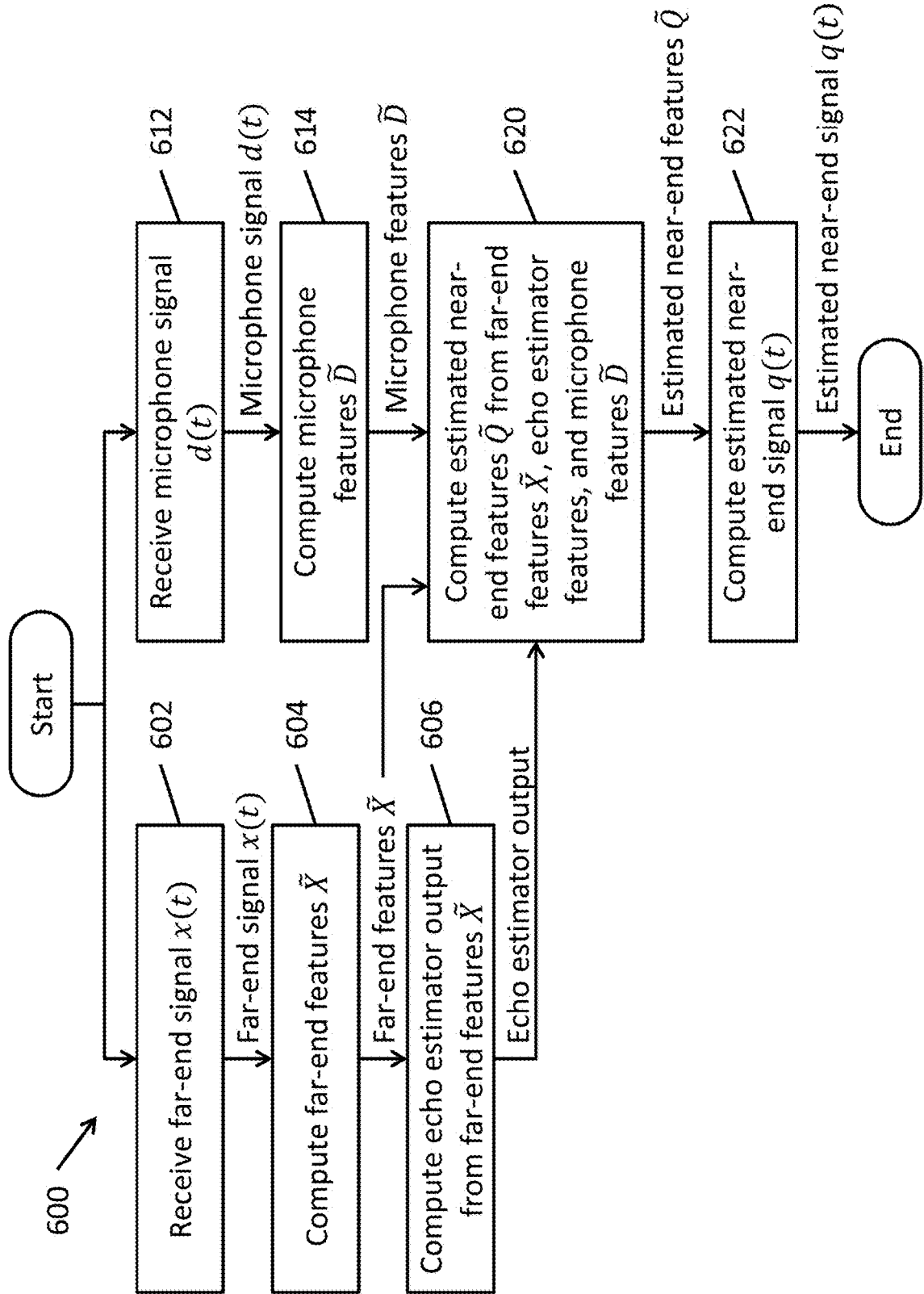
FIG. 6B is a flowchart depicting a method for computing an estimated near-end signal from a received far-end signal and a microphone signal using a neural network in inference mode in accordance with one embodiment of the present disclosure.

FIG. 6B is a flowchart depicting a method 600 for computing an estimated near-end signal from a received far-end signal and a microphone signal using a neural network in inference mode in accordance with one embodiment of the present disclosure. As shown in FIG. 6B, at 602, the acoustic echo cancellation system 200 receives the far-end signal x(t) and, at 604, the far-end signal feature extraction module 220 extracts far-end features $\tilde{X}$ from the far-end signal x(t). In addition, at 606 the first stack of the neural network, corresponding to the echo estimator 230' computes an echo estimator output from the far-end features $\tilde{X}$. (In some embodiments, the echo estimator output corresponds to the output of the $h_{k-6}^2, h_{k-5}^2, \ldots, h_k^2$ of the last GRU layer 234 of the first stack of the echo estimator 230'.)

Similarly, at 612, the acoustic echo cancellation system 200 receives the microphone signal d(t) and, at 614, the near-end signal feature extraction module 210 extracts microphone signal features $\tilde{D}$ from the microphone signal d(t).

At 620, the second stack of the neural network, corresponding to the near-end estimator 250', computes estimated near-end features $\tilde{Q}$ from the far-end features $\tilde{X}$, the echo estimator features (e.g., h), and the microphone features $\tilde{D}$. As shown in FIG. 6A, when computing the estimated near-end features $\tilde{Q}_k$ for the current frame k, features from the context of prior frames (e.g., the six prior frames k−6, k−5, . . . , k−1) in addition to the current frame k are also supplied to the near-end estimator 250'. In particular, as shown in FIG. 6A', when computing the estimated near-end features $\tilde{Q}_k$ for the current frame k, far-end features $\tilde{X}$, echo estimator outputs h, and microphone features $\tilde{D}$ from the current frame k and the six prior frames k−6, k−5, . . . , k−1 (e.g., far-end features $\tilde{X}_{k-6}, \tilde{X}_{k-5}, \ldots, \tilde{X}_k$, echo estimator outputs $h_{k-6}^2, h_{k-5}^2, \ldots, h_k^2$, and microphone features $\tilde{D}_{k-6}, \tilde{D}_{k-5}, \ldots, \tilde{D}_k$).

At 622, feature inversion module 270 of the acoustic echo cancellation system 200 computes an estimated near-end signal q(t) for the current frame from the estimated near-end features $\tilde{Q}$ of the current frame. As noted above, the features (e.g., the far-end signal features $\tilde{X}$, the microphone features $\tilde{D}$, and the estimated near-end features $\tilde{Q}$ may be in a feature space or hyperspace such as STFT space (e.g., spectral features or spectral domain). Accordingly, in some embodiments, the feature inversion module 270 transforms the estimated spectral features $\tilde{Q}$ from the feature space to a time domain signal q(t) suitable for playback on a speaker at the far-end device. As shown in FIG. 2, the phase $\angle D_{k,f}$ of the microphone signal d(t) may also be used by the inverse short-time Fourier transform (iSTFT) 274 when computing the estimated near-end signal q(t).

Figure 7:
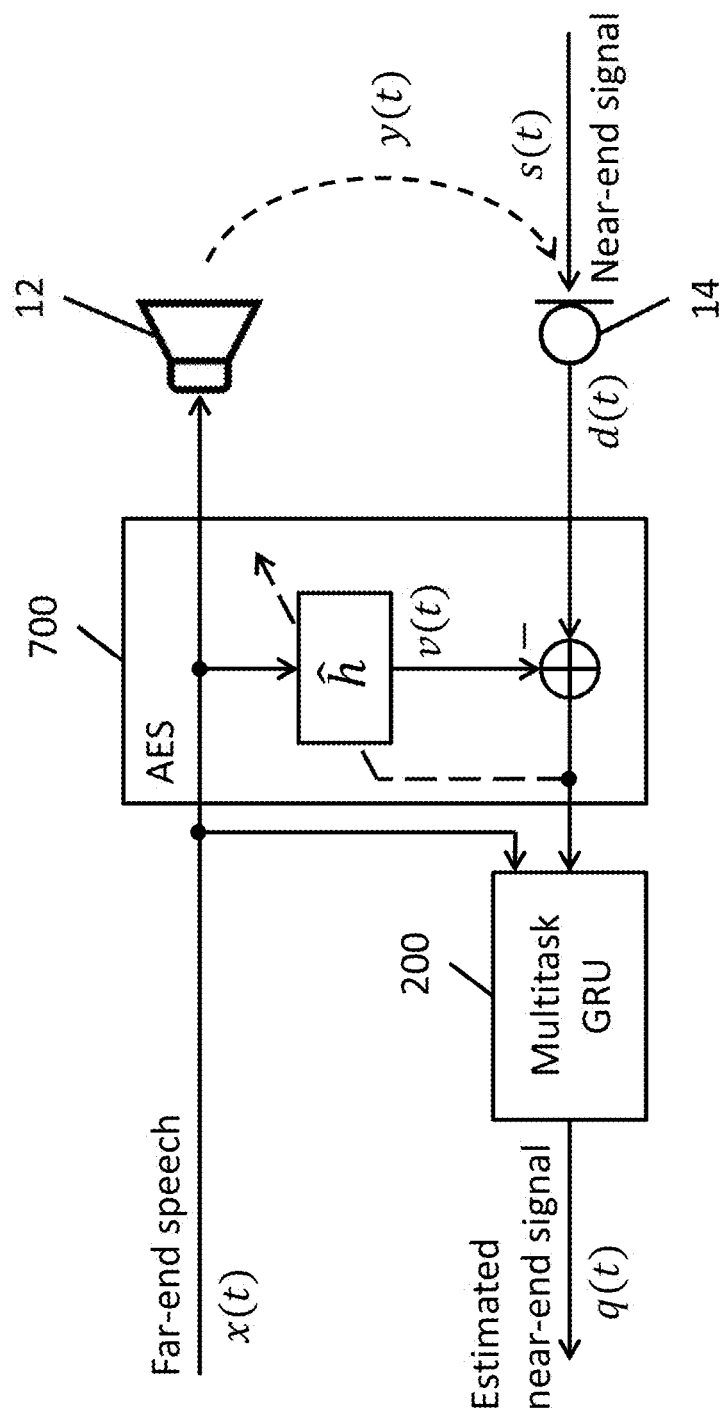
FIG. 7 is a block diagram illustrating a hybrid system including the deep multitask acoustic echo cancellation system according to embodiments of the present disclosure after a frequency domain normalized least mean square (NMLS) filter.

FIG. 7 is a block diagram illustrating a hybrid system including the deep multitask acoustic echo cancellation system according to embodiments of the present disclosure after a frequency domain normalized least mean square (NMLS) filter 700. In these embodiments, the multitask GRU network 200 has the same architecture as described above. However, for the training of this network and during inference, the output of NLMS filter 700 is used instead of the microphone signal d(t). The far-end signal x(t) remains as another input to the multitask GRU network 200, and the output targets are still the near-end features $\tilde{S}$ (as estimated as $\tilde{Q}$) and the echo features $\tilde{Y}$ (as estimated as $\tilde{V}$).

Experimental Results

To evaluate the performance of an acoustic echo cancellation system 200 as described above, experiments were performed using training data generated from the TIMIT dataset (see, e.g., F. Lamel, R. H. Kassel, and S. Seneff, "Speech database development: Design and analysis of the acoustic-phonetic corpus," in Speech Input/Output Assessment and Speech Databases, 1989.). In some embodiments of the present disclosure, seven utterances of near-end speakers were used to generate 3,500 training mixtures where each near-end signal was mixed with five different far-end signals. From the remaining 430 speakers, 100 pairs of speakers were randomly chosen as the far-end and near-end speakers. To generate 300 testing mixtures, the same procedure as described above, but with only three utterances of near-end speakers, where each near-end signal was mixed with one far-end signal. Therefore, the testing mixtures are from human speakers that were not part of the training set.

Perceptual Evaluation of Speech Quality (PESQ) scores of unprocessed test mixtures for linear and nonlinear models (no echo cancellation) are shown in Table 1. The unprocessed PESQ scores are calculated by comparing the microphone signal against near-end signal during the double-talk period.

TABLE 1

PESQ scores for unprocessed test mixtures in linear and nonlinear models of acoustic path

| Acoustic Path Model | Testing SER (dB) | | |
|---|---|---|---|
| | 0 | 3.5 | 7 |
| Linear | 1.87 | 2.11 | 2.34 |
| Nonlinear | 1.78 | 2.03 | 2.26 |

In some instances, echo return loss enhancement (ERLE) was used to evaluate the echo reduction that is achieved by the acoustic echo cancellation system 200 according to embodiments of the present disclosure during the single-talk situations where only the echo is present, where ERLE is defined as:

$$ERLE(dB) = 10\log_{10} \frac{E\{d^2(t)\}}{E\{q^2(t)\}}$$

where E is the statistical expectation operation which is realized by averaging.

To evaluate the performance of the system during the double-talk periods, we used perceptual evaluation of speech quality (PESQ). In some embodiments, PESQ is calculated by comparing the estimated near-end speech q(t) against the ground-truth near-end speech s(t) during the double-talk only periods. A PESQ score ranges from −0.5 to 4.5 and a higher score indicates better quality.

In the following discussion, a frequency domain normalized least mean square (NLMS) (see, e.g., C. Faller and J. Chen, "Suppressing acoustic echo in a spectral envelope space," IEEE Transactions on Acoustic, Speech and Signal Processing, vol. 13, no. 5, pp. 1048-1062, 2005.) is used as a comparative example. A double-talk detector (DTD) is used based on the energy of microphone signal d(t) and far-end signal x(t). In some instances, a post-processing algorithm is further based on the method presented in R. Martin and S. Gustafsson, "The echo shaping approach to acoustic echo control", Speech Communication, vol. 20, no. 3-4, pp. 181-190, 1996. Embodiments of the present disclosure are also compared against the bidirectional long short-term memory (BLSTM) method described in H. Zhang and D. Wang, "Deep Learning for Acoustic Echo Cancellation in Noisy and Double-Talk Scenarios," in Proc. Annual Conference of the International Speech Communication Association, 2018, pp. 3239-3243.

Embodiments of the present disclosure are compared against comparative methods using a linear model of the acoustic path (e.g., linear acoustic echoes). Table 2 shows the average ERLE values and PESQ gains for the conventional NLMS filter, BLSTM, and a context-aware multitask GRU according to embodiments of the present disclosure (denoted as "CA Multitask GRU"). The PESQ gain is calculated as the difference of PESQ value of each method with respect to its unprocessed PESQ value. Table 2 also shows the results for context-aware single-task GRU (denoted as "CA Single-task GRU") according to embodiments of the present disclosure that only uses the second stack of GRU layers with $\hat{D}_k$ and $\hat{X}_k$ as the inputs, where the loss function is calculated by only penalizing the network outputs against ground-truth feature vector $\hat{S}$ of near-end speech s(t). The results show that multitask GRU according to some embodiments of the present disclosure outperforms single-task GRU according to some embodiments of the present disclosure in terms of both PESQ and ERLE. It also shows that embodiments of the present disclosure outperform both conventional NLMS+Post-processing and BLSTM methods in all conditions.

TABLE 2

ERLE and PESQ scores in a linear model of acoustic path

| | | Testing SER (dB) | | |
|---|---|---|---|---|
| | Method | 0 | 3.5 | 7 |
| ERLE (dB) | NLMS + Post-processing | 29.38 | 25.88 | 21.97 |
| | BLSTM | 51.61 | 50.04 | 47.42 |
| | CA Single-task GRU | 62.88 | 61.81 | 60.11 |
| | CA Multitask GRU | 64.66 | 64.16 | 62.26 |
| PESQ gain | NLMS + Post-processing | 0.93 | 0.81 | 0.68 |
| | BLSTM | 0.80 | 0.78 | 0.74 |
| | CA Single-task GRU | 0.98 | 0.95 | 0.93 |
| | CA Multitask GRU | 1.04 | 1.02 | 0.99 |

Embodiments of the present disclosure are also compared against comparative methods using a nonlinear model of the acoustic path (e.g., nonlinear acoustic echoes). In this set of experiments, the nonlinear ground truth echo signal $y_{nl}(t)$ was used to generate the microphone signals d(t), therefore the model contains both power amplifier clipping and loudspeaker distortions (e.g., corresponding to 515-3 and 515-7 of FIG. 5C). The results of embodiments of the present disclosure are compared against comparative AES+RES methods including NLMS. In the nonlinear acoustic path, the performance was also compared against a deep neural network (DNN)-based residual echo suppression (RES) system that was described in C. M. Lee, J. W. Shin, and N. S. Kim, "DNN-based residual echo suppression," in Proc. Annual Conference of the International Speech Communication Association, 2015, pp. 1775-1779. and denoted in the table as "AES+DNN." The results in Table 3 show that embodiments of the present disclosure outperform the other two comparative methods in both PESQ and ERLE.

TABLE 3

ERLE and PESQ scores in nonlinear model of acoustic path

| | | Testing SER (dB) | | |
|---|---|---|---|---|
| | Method | 0 | 3.5 | 7 |
| ERLE (dB) | NLMS + Post-processing | 16.76 | 14.26 | 12.33 |
| | AES + DNN | — | 36.59 | — |
| | CA Multitask GRU | 61.79 | 60.52 | 59.47 |
| PESQ gain | NLMS + Post-processing | 0.54 | 0.43 | 0.31 |
| | AES + DNN | — | 0.62 | — |
| | CA Multitask GRU | 0.84 | 0.83 | 0.81 |

Embodiments of the present disclosure achieve superior echo reduction without significant near-end distortion (e.g., the spectra corresponding to the estimated near-end signal and the actual near-end signal are very similar).

The performance of embodiments of the present disclosure was also evaluated in the presence of additive noise and a nonlinear model of the acoustic path. In these embodiments, when generating the training data, white noise at 10 dB SNR was added to the near-end signal s(t), with nonlinear acoustic path at 3.5 dB SER level. Embodiments of the present disclosure were then compared against a conventional NLMS+Post-processing system. As shown in Table 4 below, aspects of embodiments of the present disclosure outperform the comparative method by a large margin.

TABLE 4

ERLE and PESQ scores in nonlinear model of acoustic path
(SER = 3.5 dB) and additive noise (SNR = 10 dB)

| ERLE (dB) | NLMS + Post-processing | 10.13 |
|---|---|---|
| | CA Multitask GRU | 46.12 |
| | None | 1.80 |
| PESQ | NLMS + Post-processing | 2.01 |
| | CA Multitask GRU | 2.50 |

In addition, the alternative hybrid embodiment discussed above was evaluated for unseen RIRs for different reverberation times and loudspeaker distances from the microphone. In this evaluation, the models were trained and tested using the same RIRs discussed above corresponding to a room size of 4 meters×4 meters×3 meters with reverberation time of 200 ms, and random loudspeaker distance of 1.5 meters from microphone and total length of 512 samples. During the testing of a hybrid system according to embodiments of the present disclosure, the loudspeaker distance was changed 15 cm. The results of frequency domain NLMS and a hybrid method of NLMS and multitask GRU according to embodiments of the present disclosure that was trained with the above RIRs are shown in Table 5. The multitask GRU was further fine-tuned with the RIRs that were generated in multiple room sizes (small, medium, and large), various reverberation times (from 250 ms to 900 ms), and loudspeaker distance of 15 cm. The fine-tuned results are also shown in Table 5, below. These results suggest that the hybrid method according to some embodiments of the present disclosure can perform better if the model is fine-tuned with the impulse response of the target device (e.g., target end-user near-end device).

TABLE 5

ERLE and PESQ scores of hybrid method

| | | |
|---|---|---|
| ERLE (dB) | NLMS | 14.70 |
| | Hybrid Multitask GRU | 37.68 |
| | Hybrid Multitask GRU (Fine-tuned) | 41.17 |
| | None | 2.06 |
| PESQ | NLMS | 2.70 |
| | Hybrid Multitask GRU | 3.23 |
| | Hybrid Multitask GRU (Fine-tuned) | 3.37 |

Additional Embodiments

Figure 8A:
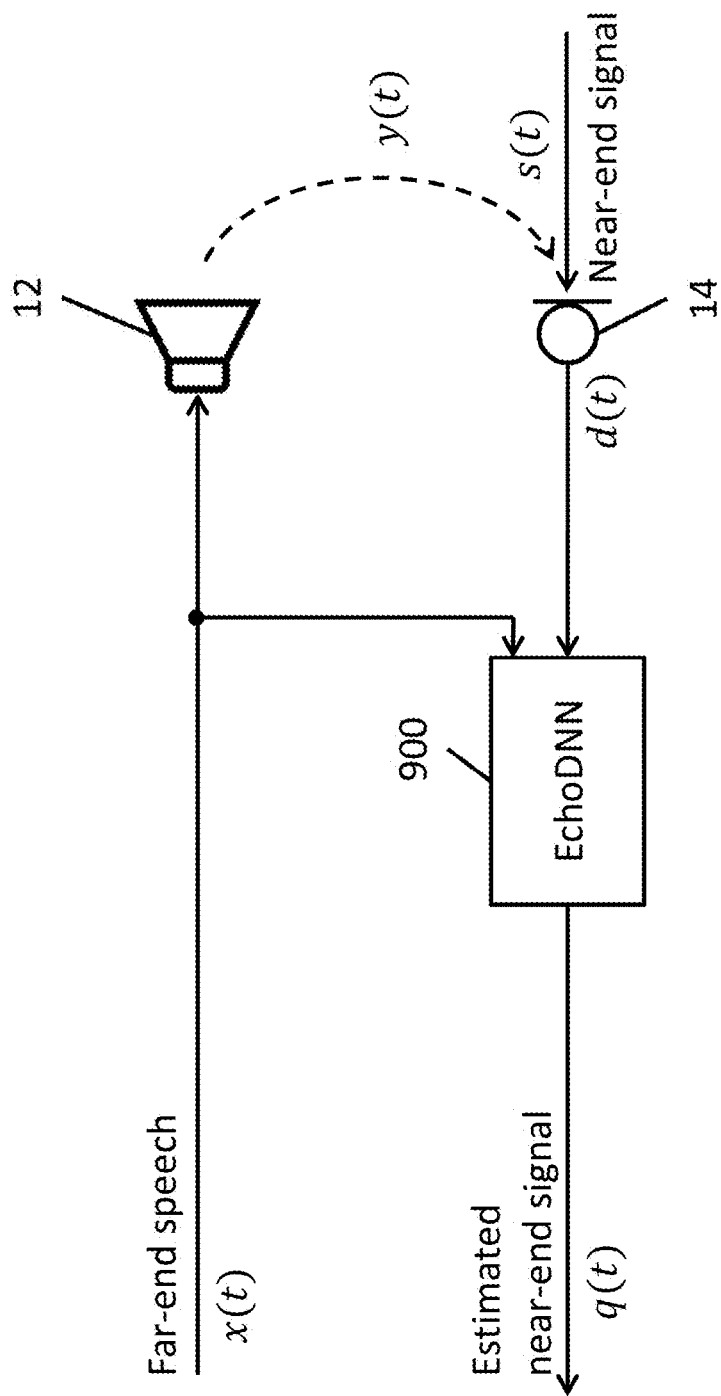
FIG. 8A is a schematic block diagram of an acoustic echo cancellation system in which deep neural network (denoted as "EchoDNN") according to one embodiment of the present disclosure is used to cancel echoes from a microphone signal.

Some embodiments of the present disclosure are directed to different architectures for the neural network of the acoustic echo cancellation system 200. FIG. 8A is a schematic block diagram of an acoustic echo cancellation system in which deep neural network (denoted as "EchoDNN") according to one embodiment of the present disclosure is used to cancel echoes from a microphone signal d(t). According to some embodiments of the present disclosure, the EchoDNN 900 uses only multiple fully connected (FC) layers.

Figure 8B:
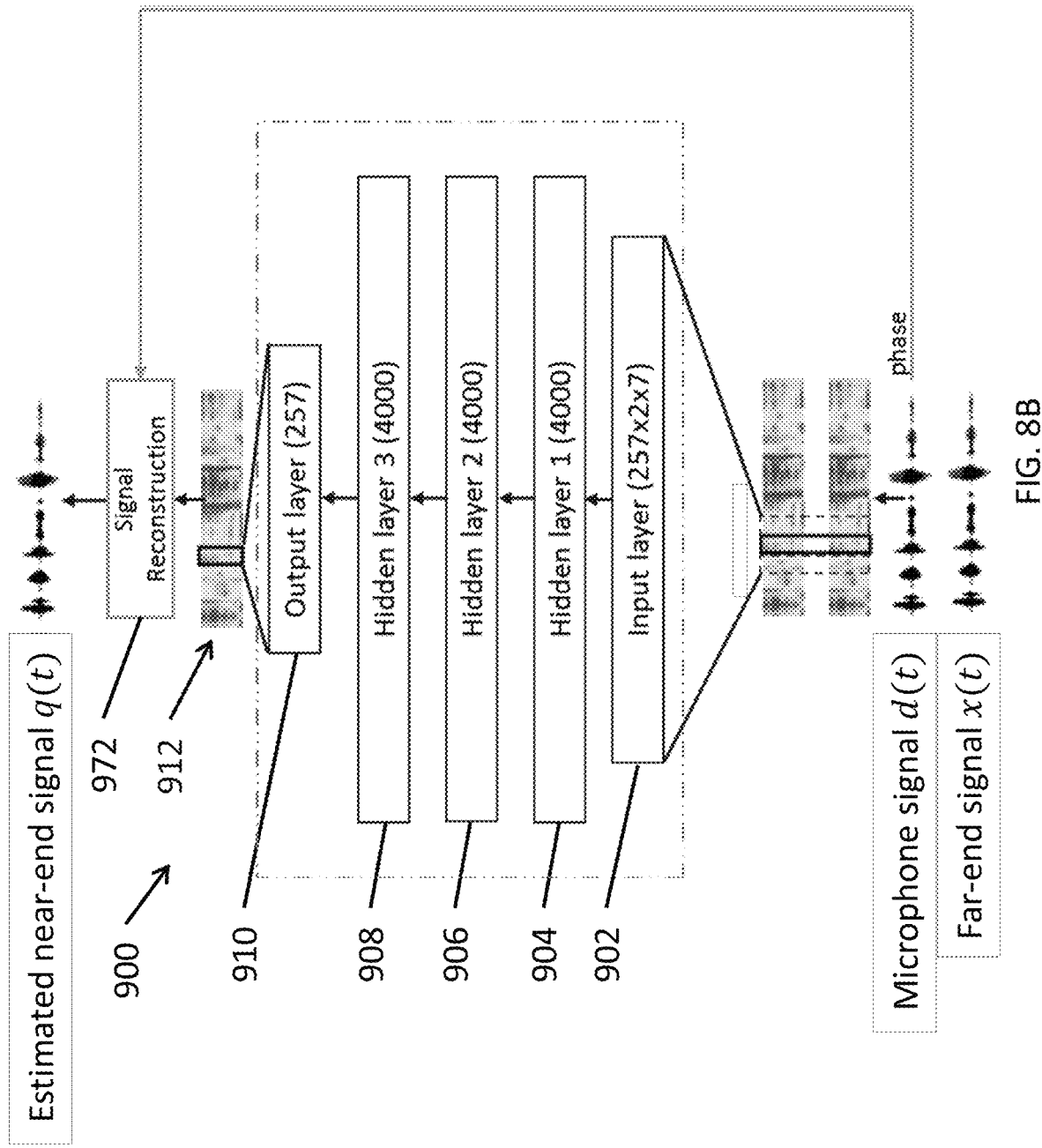
FIG. 8B is an architectural block diagram of a deep neural network according to one embodiment of the present disclosure configured to cancel echoes from a microphone signal.

FIG. 8B is an architectural block diagram of a deep neural network according to one embodiment of the present disclosure configured to cancel echoes from a microphone signal. As shown in FIG. 8B, the extracted features $\tilde{D}$ and $\tilde{X}$ from both microphone d(t) and far-end x(t) signals are fed into an input layer 902 of the fully connected deep network 900. In the embodiment shown in FIG. 8B, the network includes three hidden layers 904, 906, and 908, and an output layer 910. Each of these layers may be a fully connected layer implementing, for example, an affine transformation. In some embodiments, each of three fully connected hidden layers 904, 906, and 908 include 4,000 units (e.g., neurons). In some embodiments, the output layer 910 is also a fully connected layer with 257 units (equal to the number of frequency bins of the extracted Log-Mag features). For the Log-Mel-Mag features, in some embodiments, the output layer used 80 units. In some embodiments, an exponential linear unit (ELU) is used as the activation function for each unit.

The estimated features 912 of the near-end signal are obtained directly from the output of the network 900. These features are converted back to the time-domain to synthesize the estimated near-end speech signal, e.g., using the feature inversion module 270 described above. In some embodiments, for both microphone d(t) and near-end signals s(t) sampled at the rate of 16 kHz, a frame size of 512 samples with 50% overlap was used. A 512-point short-time Fourier transform (STFT) was then applied to each frame of input signals resulted in 257 frequency bins. The final log-magnitude (Log-Mag) features were computed after calculating the logarithm operation on the magnitude values. In some embodiments of the present disclosure, the log-mel-magnitude (Log-Mel-Mag) was used as the final features 912 to reduce the dimensionality of the feature space and therefore reduce the complexity of the technique applied in these embodiments. In some embodiments, the features are compressed by using a 80-dimentional Mel-transformation matrix.

In order to use contextual information, in some embodiments, features for contextual frames of both input signals are also extracted and concatenated as the input features.

In various embodiments either log-magnitude (Log-Mag) features or Log-mag (or Log-Mel-Mag) of the near-end speech signal were used as the target labels during training.

In some embodiments, AMSGRAD is used as the optimizer during training. In some embodiments, mean absolute error (MAE) between the target labels and the output of the network was used as the loss function.

Figure 9:
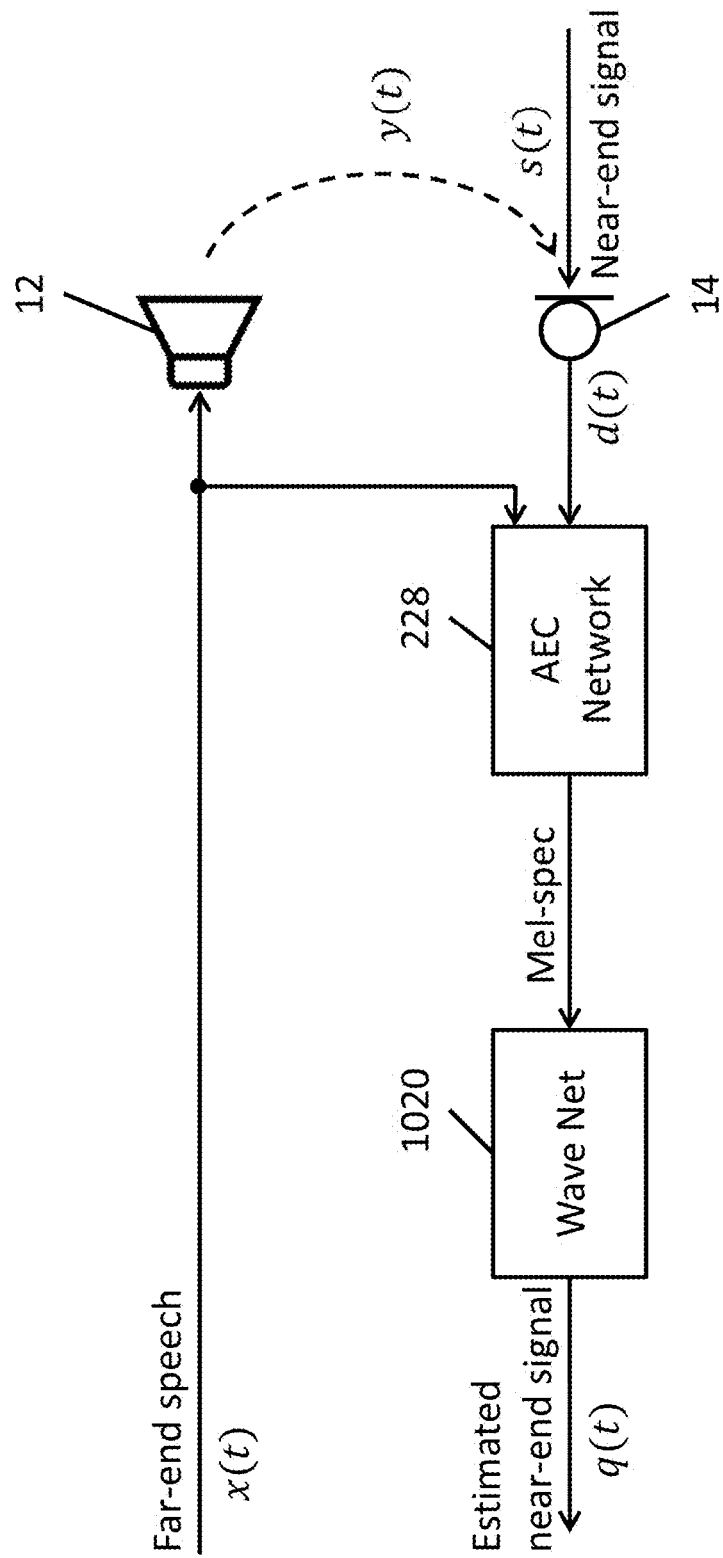
FIG. 9 is a block diagram illustrating an acoustic echo cancellation system using a generative network according to one embodiment of the present disclosure.

FIG. 9 is a block diagram illustrating an acoustic echo cancellation system using a generative network according to one embodiment of the present disclosure. In the embodiment shown in FIG. 9, a generative model 1020 such as WaveNet (see, e.g., Oord, Aaron van den, et al. "Wavenet: A generative model for raw audio." arXiv preprint arXiv: 1609.03499 (2016).) at the output of the AEC network (e.g., at the output of the near-end estimator 250) in place of the feature inversion module 270. Generative networks such as WaveNet can enhance the output of an automatic echo cancellation system (AEC) 228 based on the information (e.g., mel-log-magnitude) that is provided by the AEC output or "Mel-spec." This generative network 1200 may reconstruct the near-end speech signal q(t) at a much higher accuracy in comparison to the inverse STFT (iSTFT) 274.

Figure 10:
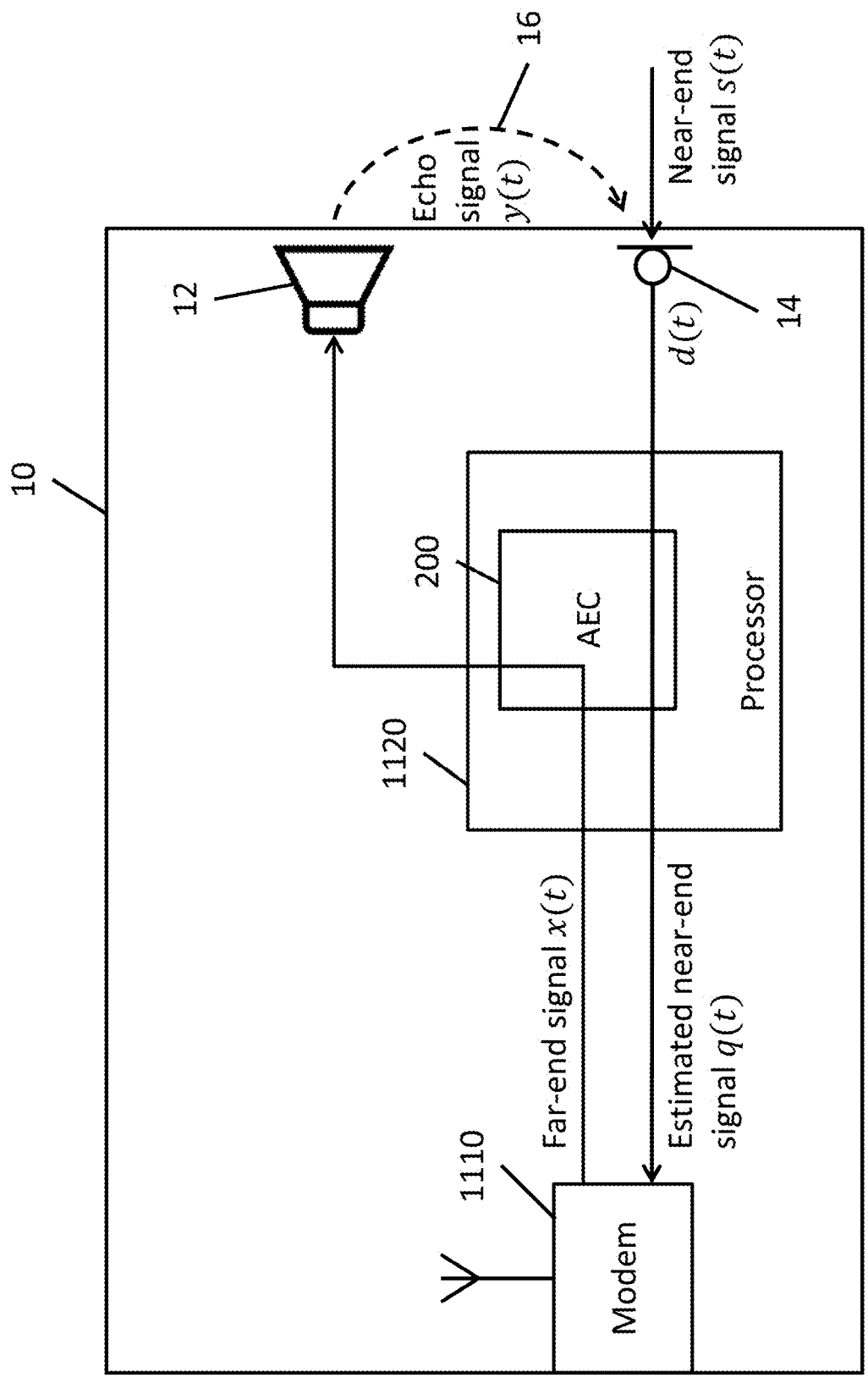
FIG. 10 is a block diagram of a near-end device according to one embodiment of the present disclosure.

FIG. 10 is a block diagram of a near-end device according to one embodiment of the present disclosure. As noted above, in some embodiments the near-end device 10 is a communications device such as a smartphone or a tablet. The near-end device 10 may include a modem 1110 configured to send and receive data, such as voice communications data. The modem may include a signal processor configured to convert the received encoded data into audio data (e.g., pulse coded modulation data) corresponding to the far-end signal x(t). The decoded data is supplied to a processor 1120, which may implement the acoustic echo cancellation system 200. As noted above, in various embodiments of the present disclosure, the processor implementing the acoustic echo cancellation system 200 may be: a general purpose central processing unit; a graphical processing unit (GPU); a field programmable gate array (FPGA); an neural processing unit (NPU) or neural network processor (NNP) (e.g., a processor having an architecture tailored to perform inference using a neural network); or a neuromorphic processor, although embodiments of the present disclosure are not limited thereto. The received far-end signal x(t) may be played through a loudspeaker 12, which emits sound waves into the environment, some of which may be reflected and received by the microphone 14, which also receives a near-end signal s(t). The generated microphone signal d(t) is supplied to the processor 1120 and the acoustic echo cancellation system 200 to compute the estimated near-end signal q(t), which is transmitted to the far-end device via the modem 1110. Generally, a near-end device 10 may include other components not shown in FIG. 10, such as user interface components (e.g., buttons, a touchscreen display, and the like), a battery or other power source, additional general purpose or special purpose processors, transitory and non-transitory memory, and the like.

Accordingly, aspects of embodiments of the present disclosure relate to deep neural networks, including deep multitask recurrent neural networks, for acoustic echo cancellation (AEC). As shown in experimental results, embodiments of the present disclosure perform well in both single-talk and double-talk periods. Some aspects of embodiments of the present disclosure relate to end-to-end multitask learning of both the echo and the near-end signal simultaneously, which improves the overall performance of the trained AEC system. In addition, some aspects of embodiments relate to the use of low-latency causal context windows to improve the context-awareness when estimating the near-end signal with the acoustic echoes removed. When compared based on reference datasets, embodiments of the present disclosure can reduce the echo more significantly than comparative techniques and is robust to additive background noise. Further, a hybrid method according to some embodiments of the present disclosure is more robust to the changes in room impulse response (RIR) and can perform well if fine-tuned by augmenting the data simulated with the impulse response of the target device (e.g., the end-user near-end device 10) under use.

As such, aspects of embodiments of the present disclosure relate to echo cancellation or echo suppression using a trained neural deep recurrent neural network. While the present disclosure has been described in connection with certain exemplary embodiments, it is to be understood that the disclosure is not limited to the disclosed embodiments, but, on the contrary, is intended to cover various modifications and equivalent arrangements included within the scope of the appended claims, and equivalents thereof.

What is claimed is:

1. A method for performing echo cancellation comprising:
receiving, by a plurality of input layer gated recurrent units (GRUs) of a recurrent neural network, a plurality of far-end features;
computing a plurality of estimated near-end features using the recurrent neural network based on a plurality of microphone features extracted from a microphone signal and the plurality of far-end features; and
computing an estimated near-end signal using the plurality of estimated near-end features.

2. The method of claim 1, wherein the estimated near-end signal is computed using a plurality of estimated echo features.

3. The method of claim 2, wherein the plurality of estimated echo features are computed using the recurrent neural network.

4. The method of claim 3, wherein the plurality of far-end features are extracted from a far-end signal received, from a far-end device, at a near-end device.

5. The method of claim 4, wherein the microphone signal is recorded at a microphone of the near-end device.

6. The method of claim 5, wherein the microphone features comprise a current frame of microphone features and a causal window of a plurality of previous frames of microphone features.

7. The method of claim 1, wherein the far-end features comprise a current frame of far-end features and a causal window of a plurality of previous frames of far-end features.

8. The method of claim 2, wherein the estimated echo features comprise a current frame of estimated echo features and a causal window of a plurality of previous frames of estimated echo features, and
wherein the estimated near-end features comprise a current frame of estimated near-end features and the causal window of a plurality of previous frames of estimated near-end features.

9. The method of claim 1, wherein the estimated near-end features comprise log short time Fourier transform features in logarithmic spectral space.

10. A communication device configured to perform echo cancellation, the communication device comprising:
a modem;
a microphone;
a processor; and
memory storing instructions that, when executed by the processor, cause the processor to:
receive, by a plurality of input layer gated recurrent units (GRUs) of a recurrent neural network, a plurality of far-end features;
compute a plurality of estimated near-end features using the recurrent neural network based on a plurality of microphone features extracted from a microphone signal and the plurality of far-end features; and
compute an estimated near-end signal using the plurality of estimated near-end features.

11. The communication device of claim 10, wherein the estimated near-end signal is computed using a plurality of estimated echo features.

12. The communication device of claim 11, wherein the plurality of estimated echo features are computed using the recurrent neural network.

13. The communication device of claim 12, wherein the plurality of far-end features are extracted from a far-end signal received, from a far-end device, at the communication device via the modem.

14. The communication device of claim 13, wherein the microphone signal is recorded at the microphone of the communication device.

15. The communication device of claim 14, wherein the microphone features comprise a current frame of microphone features and a causal window of a plurality of previous frames of microphone features.

16. The communication device of claim 10, wherein the far-end features comprise a current frame of far-end features and a causal window of a plurality of previous frames of far-end features.

17. The communication device of claim 11, wherein the estimated echo features comprise a current frame of estimated echo features and a causal window of a plurality of previous frames of estimated echo features, and
wherein the estimated near-end features comprise a current frame of estimated near-end features and the causal window of a plurality of previous frames of estimated near-end features.

18. The communication device of claim 10, wherein the estimated near-end features comprise log short time Fourier transform features in logarithmic spectral space.

* * * * *